United States Patent
Nishimura et al.

(10) Patent No.: US 9,980,286 B2
(45) Date of Patent: May 22, 2018

(54) WIRELESS COMMUNICATION METHOD, APPARATUS AND PROGRAM TO MANAGE CHANNEL USAGE

(71) Applicant: Hitachi, Ltd., Tokyo (JP)

(72) Inventors: Haruki Nishimura, Tokyo (JP);
Ryosuke Fujiwara, Tokyo (JP);
Masayuki Miyazaki, Tokyo (JP);
Makoto Katagishi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1 day.

(21) Appl. No.: 15/111,009

(22) PCT Filed: Mar. 10, 2014

(86) PCT No.: PCT/JP2014/056189
§ 371 (c)(1),
(2) Date: Jul. 12, 2016

(87) PCT Pub. No.: WO2015/136599
PCT Pub. Date: Sep. 17, 2015

(65) Prior Publication Data
US 2016/0345359 A1 Nov. 24, 2016

(51) Int. Cl.
*H04W 74/06* (2009.01)
*H04W 74/00* (2009.01)
*H04W 16/14* (2009.01)

(52) U.S. Cl.
CPC .......... *H04W 74/06* (2013.01); *H04W 16/14* (2013.01); *H04W 74/002* (2013.01)

(58) Field of Classification Search
None
See application file for complete search history.

(56) References Cited

U.S. PATENT DOCUMENTS

| 2005/0068934 A1 | 3/2005 | Sakoda | |
|---|---|---|---|
| 2013/0070627 A1* | 3/2013 | Chen | H04W 74/08 370/252 |

(Continued)

FOREIGN PATENT DOCUMENTS

| JP | 2007-074214 A | 3/2007 |
|---|---|---|
| JP | 2010-206828 A | 9/2010 |

(Continued)

OTHER PUBLICATIONS

International Preliminary Report on Patentability received in corresponding International Application No. PCT/JP2014/056189 dated Sep. 22, 2016.

(Continued)

*Primary Examiner* — Anh Ngoc Nguyen
(74) *Attorney, Agent, or Firm* — Mattingly & Malur, PC

(57) ABSTRACT

A packet collision among a plurality of access points is avoided and QoS is ensured. An access point that shares a wireless channel with a plurality of access points to carry out communication is provided with a function for determining, based on information contained in a polling communication signal or a broadcast signal transmitted from another access point, an access point (preceding AP) that is to perform polling communication immediately before the own station to form a group within which the order of the polling communication is determined, and after determining that a polling communication period of the preceding AP has ended, starting the polling communication period of the own station in a wireless network.

15 Claims, 25 Drawing Sheets

(56) References Cited

U.S. PATENT DOCUMENTS

2014/0143408 A1* 5/2014 Workman ............... H04W 4/02
                                                                                            709/224
2016/0050040 A1* 2/2016 Kosaka ................ H04W 74/06
                                                                                            370/236

FOREIGN PATENT DOCUMENTS

| JP | 2012-235453 A | 11/2012 |
| JP | 5429761 B1 | 12/2013 |
| WO | 2004/071022 A1 | 8/2004 |

OTHER PUBLICATIONS

International Search Report of PCT/JP2014/056189 dated Jun. 3, 2014.

* cited by examiner

FIG. 13
[INITIAL VALUE]
| Index | address | pre_AP | Gr_id |
|---|---|---|---|
| 0 | 0 | - | - |
305-32
[AFTER RECEIVING POLLING SIGNAL FROM AP1]
| Index | Address | pre_AP | Gr_id |
|---|---|---|---|
| 0 | 0 | - | - |
| 1 | AP1 | 0 | AP1 |
305-32
| Index | address | pre_AP | Gr_id |
|---|---|---|---|
| 0 | 0 | | - |
| 1 | AP1 | 0 | AP1 |
305-32
⇒
305-22
| ITEM | address | pre_AP | Gr_id |
|---|---|---|---|
| VALUE | AP2 | AP1 | AP1 |
[INITIAL VALUE]
| Index | address | pre_AP | Gr_id |
|---|---|---|---|
| 0 | 0 | - | - |
305-33
[AFTER RECEIVING POLLING SIGNAL FROM AP1]
| Index | Address | pre_AP | Gr_id |
|---|---|---|---|
| 0 | 0 | - | - |
| 1 | AP1 | 0 | AP1 |
305-33
| Index | address | pre_AP | Gr_id |
|---|---|---|---|
| 0 | 0 | | - |
| 1 | AP1 | 0 | AP1 |
305-33
⇒
305-23
| ITEM | address | pre_AP | Gr_id |
|---|---|---|---|
| VALUE | AP3 | AP1 | AP1 |

FIG. 16

| ITEM | address | pre_AP | Gr_id | NO_AP | coll_th |
|---|---|---|---|---|---|
| VALUE | AP1 | 0 | AP1 | 1 | 5 |

305-21

| ITEM | address | pre_AP | Gr_id | NO_AP | coll_th |
|---|---|---|---|---|---|
| VALUE | AP2 | AP1 | AP1 | 2 | 4 |

305-22

| ITEM | address | pre_AP | Gr_id | NO_AP | coll_th |
|---|---|---|---|---|---|
| VALUE | AP3 | AP2 | AP1 | 3 | 3 |

305-23

| ITEM | address | pre_AP | Gr_id | NO_AP | coll_th |
|---|---|---|---|---|---|
| VALUE | AP4 | 0 | AP4 | 1 | 5 |

305-24

| ITEM | address | pre_AP | Gr_id | NO_AP | coll_th |
|---|---|---|---|---|---|
| VALUE | AP5 | AP4 | AP4 | 2 | 4 |

| ITEM | address | pre_AP | Gr_id | NO_AP | comm_mode |
|---|---|---|---|---|---|
| VALUE | AP1 | 0 | AP1 | 1 | 0 |

305-21

| ITEM | address | pre_AP | Gr_id | NO_AP | comm_mode |
|---|---|---|---|---|---|
| VALUE | AP2 | AP1 | AP1 | 2 | 1 |

305-22

| ITEM | address | pre_AP | Gr_id | NO_AP | comm_mode |
|---|---|---|---|---|---|
| VALUE | AP3 | AP2 | AP1 | 3 | 2 |

| comm_mode | OPERATION CONTENT |
|---|---|
| 0 | THREE STAS |
| 1 | REDUCE DATA RATE OF TRANSMISSION FOR RESPECTIVE STAS |
| 2 | ONLY ONE STA |
| ... | ... |

WIRELESS COMMUNICATION METHOD, APPARATUS AND PROGRAM TO MANAGE CHANNEL USAGE

TECHNICAL FIELD

The present invention relates to a method, an apparatus, and a program for wireless communication. In particular, the invention relates to a wireless communication method for a wireless access point apparatus, the wireless access point apparatus, and a wireless communication program.

BACKGROUND ART

Examples of representative methods for media access control for a wireless network include distributed coordination function (DCF) defined in a standard for a wireless LAN, namely, IEEE802.11, and a method based on autonomous distributed control such as enhanced distributed channel access (EDCA). Meanwhile, in order to ensure better quality of service (QoS) for respective clients, a centralized control type method using a polling signal has been proposed, including point coordination function (PCF) and hybrid coordination function controlled channel access (HCCA). Such a method is used for a service requiring a real-time property.

Each of JP 2012-235453 A (PTL 1) and JP 2007-74214 A (PTL 2) offers a technique for providing the QoS based on the aforementioned technique. PTL 1 discloses that "in order to ensure that an opportunity for correcting transmission failure is given to a station that has failed to properly transmit data, a selective polling technique is used to selectively polling stations within a wireless network. The selective polling technique can be applied to any polling-based system and therefore, downward compatibility with a legacy system is maintained." (summary).

PTL 2 discloses that "in a wireless packet scheduling extension method that carries out centralized management of a wireless terminal apparatus (station) using a wireless base station apparatus (access point) to obtain a function for sharing a frequency with another wireless base station apparatus and to obtain a scheduling control means for transmitting/receiving cyclic data, a beacon transmission period interval is virtually made into a slot such that a slot determined as being not in use in a transmission period interval provided for data transmission/reception during slot assignment is selected to be assigned." (summary).

PTL 3 discloses that "in a wireless communication system including a plurality of communication stations, the respective communication stations mutually transmit beacons in which information on a network is stated to build the network. In this case, neighbor beacon information on a beacon transmission time of a neighbor communication station is used as information expressed by a relative time with respect to a timer value of the own station to realize efficient data transmission while avoiding a beacon collision, thereby obtaining an excellent wireless communication system." (summary).

CITATION LIST

Patent Literature

PTL 1: JP 2012-235453 A
PTL 2: JP 2007-74214 A
PTL 3: JP 2010-206828 A

SUMMARY OF INVENTION

Technical Problem

PTL 1 describes a mechanism of the access point including a wireless transceiver that polls a plurality of stations in accordance with a predetermined schedule. Meanwhile, PTL 2 describes a mechanism of the wireless base station apparatus for avoiding a polling signal collision which can occur when a plurality of wireless networks is present.

However, the two PTLs described above do not deal with a case where the plurality of access points is present on the same channel, each of which affects communicable areas of the others. The technique described in PTL 1 does not assume a case where the plurality of access points is present and therefore, it is not possible to avoid a packet collision. The wireless base station apparatus according to PTL 2 divides a beacon transmission period into virtual slots to perform a channel scan prior to transmitting the polling signal such that a slot that can be cyclically used is assigned to a period for which data can be transmitted/received. However, there is a possibility that all terminals cannot regularly obtain a transmission right, which accordingly causes a problem that the QoS cannot be ensured in some cases.

When the technique described in PTL 1 is applied as it is to a case where the plurality of access points is present on the same channel, the problem as described below occurs.

FIG. 1 is a diagram illustrating an example of the polling signal collision when the plurality of access points is disposed, which is a problem of the prior patent art.

As illustrated in FIG. 1, for example, in a case where three access points are present and an access point (AP1) is performing polling communication (100), two access points (AP2 and AP3) are waiting for the AP1 to complete the polling communication (101 through 102) and thereafter, starts the polling communication at the same time (or, substantially at the same time) (103 and 104). Accordingly, the polling signals from both of the access points collide (105) and as a result, a decrease in throughput or an increase in delay is likely to arise.

Taking the aforementioned problem into account, an object of the present invention is to avoid a packet collision among the plurality of access points.

Solution to Problem

According to a first solution of the invention,
a wireless communication method is provided
which manages channel usage including address information of one nearby access point (AP) or a plurality of nearby access points (APs) being present nearby and performing polling communication or broadcast communication, and group information of the nearby AP(s).

Each of the nearby APs transmits a polling communication signal or a broadcast signal containing communication parameter information including the address information of the own AP, the address information of a preceding AP, and the group information of the own AP, observes a channel prior to starting the polling communication or the broadcast communication to confirm whether an AP performing the polling communication is present and, when detecting the polling communication signal or the broadcast signal from one of the nearby APs, adds, to the channel usage, the address information of the nearby AP and the group information of the nearby AP contained in the polling communication signal or the broadcast signal to update the channel usage, determines the address information of the preceding AP that is to perform the polling communication or the broadcast communication immediately before the own AP or the address information indicating that no preceding AP is present and the group information of the own AP based on the channel usage to create and maintain the communication parameter information of the own AP, and starts a service interval in accordance with the communication parameter information.

According to a second solution of the invention, a wireless communication apparatus is provided which includes an AP list table that manages channel usage including address information of one nearby access point (AP) or a plurality of nearby access points (APs) being present nearby and performing polling communication or broadcast communication, and group information of the nearby AP(s), a parameter table in which each of the nearby APs stores communication parameter information including the address information of the own AP, the address information of a preceding AP, and the group information of the own AP, and a processing unit.

The processing unit transmits a polling communication signal or a broadcast signal containing the communication parameter information read from the parameter table, observes a channel prior to starting the polling communication or the broadcast communication to confirm whether an AP performing the polling communication is present and, when detecting the polling communication signal or the broadcast signal from one of the nearby APs, adds, to the channel usage, the address information of the nearby AP and the group information of the nearby AP contained in the polling communication signal or the broadcast signal to update the AP list table, refers to the AP list table to determine the address information of the preceding AP that is to perform the polling communication or the broadcast communication immediately before the own AP or the address information indicating that no preceding AP is present and the group information of the own AP based on the channel usage and creates the communication parameter information of the own AP to maintain in the parameter table, and starts a service interval in accordance with the communication parameter information stored in the parameter table.

According to a third solution of the invention, a wireless communication program is provided which causes a computer to carry out processing, in which a processing unit stores, to an AP list table, channel usage including address information of one nearby access point (AP) or a plurality of nearby access points (APs) being present nearby and performing polling communication or broadcast communication, and group information of the nearby AP(s) to manage the channel usage, the processing unit stores communication parameter information of each of the nearby APs to a parameter table, the communication parameter information including the address information of the own AP, the address information of a preceding AP, and the group information of the own AP, the processing unit transmits a polling communication signal or a broadcast signal containing the communication parameter information read from the parameter table, the processing unit observes a channel prior to starting the polling communication or the broadcast communication to confirm whether an AP performing the polling communication is present and, when detecting the polling communication signal or the broadcast signal from one of the nearby APs, adds, to the channel usage, the address information of the nearby AP and the group information of the nearby AP contained in the polling communication signal or the broadcast signal to update the AP list table, the processing unit refers to the AP list table to determine the address information of the preceding AP that is to perform the polling communication or the broadcast communication immediately before the own AP or the address information indicating that no preceding AP is present and the group information of the own AP based on the channel usage and creates the communication parameter information of the own AP to maintain in the parameter table, and the processing unit starts a service interval in accordance with the communication parameter information stored in the parameter table.

Advantageous Effects of Invention

According to the invention, it is possible to avoid a packet collision among the plurality of access points.

BRIEF DESCRIPTION OF DRAWINGS

FIG. 13 illustrates an AP list table required in the third working example and an example where the preceding AP is determined based on the AP list table.

FIG. 16 illustrates an exemplary parameter table provided in the access point, which is required in the fourth working example.

FIG. 20 illustrates an exemplary parameter table provided in the access point, which is required in a fifth working example.

FIG. 21 illustrates an exemplary table required to adjust a traffic volume in the fifth working example.

DESCRIPTION OF EMBODIMENTS

A. Overview

Figure 1:
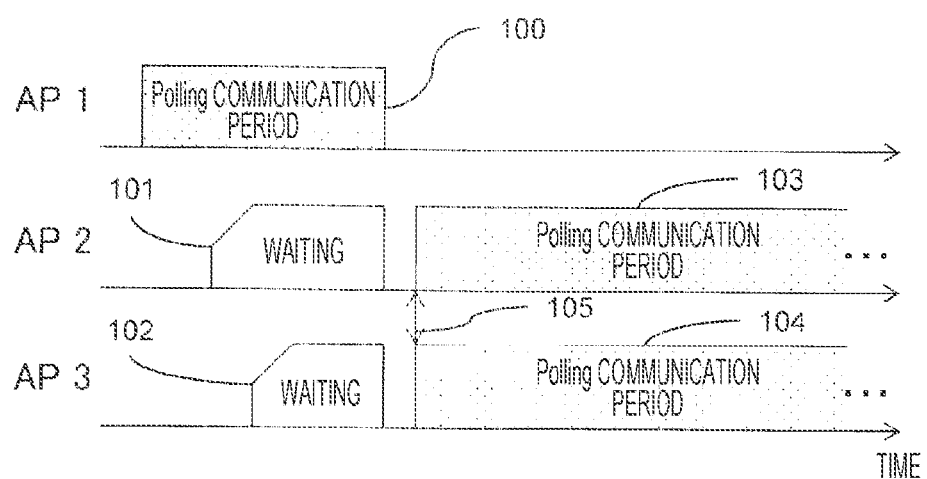
FIG. 1 is a diagram illustrating an example of a polling signal collision when a plurality of access points is disposed, which is a problem of prior patent art.

An embodiment provides an access point that performs polling communication in which, for example, polling is transmitted to a connected wireless terminal and response data is received therefrom. The access point has a function for managing channel usage of nearby access points performing the polling communication. The access point further has a function of detecting a packet signal containing communication parameter information from an access point present nearby to update the channel usage prior to starting the polling communication; determining an access point (preceding AP) that is to perform the polling communication immediately before the own station based on the channel usage along with the order of polling thereof and a group thereof and maintaining this information as the communication parameter information; waiting for a polling communication period of the preceding AP to end; upon determining that the polling communication period of the preceding AP has ended, starting the polling communication with the connected wireless terminal; and generating and transmitting the packet signal containing the communication parameter information. It is favorable that the packet signal be a signal transmitted to the connected wireless terminal (polling communication signal) or a signal transmitted through broadcasting to the nearby access points (broadcast signal).

The following embodiments will describe a case where the polling communication signal is used for the polling communication. Instead of this, the embodiments may be configured to use the signal transmitted through broadcasting to the nearby access points in the broadcast communication (broadcast signal).

B. Embodiments

Hereinafter, the embodiments of the invention will be described with reference to the accompanying drawings. Note that the embodiments merely serve as examples for realizing the invention and therefore, the technical scope of the invention is not limited by the embodiments. Common configurations are denoted by the same reference numerals in the respective drawings.

First Working Example

A wireless access point apparatus according to the embodiments constitutes a basic service set in which the wireless access point apparatus is wirelessly connected with a plurality of wireless terminals sharing the same frequency band.

Figure 2:
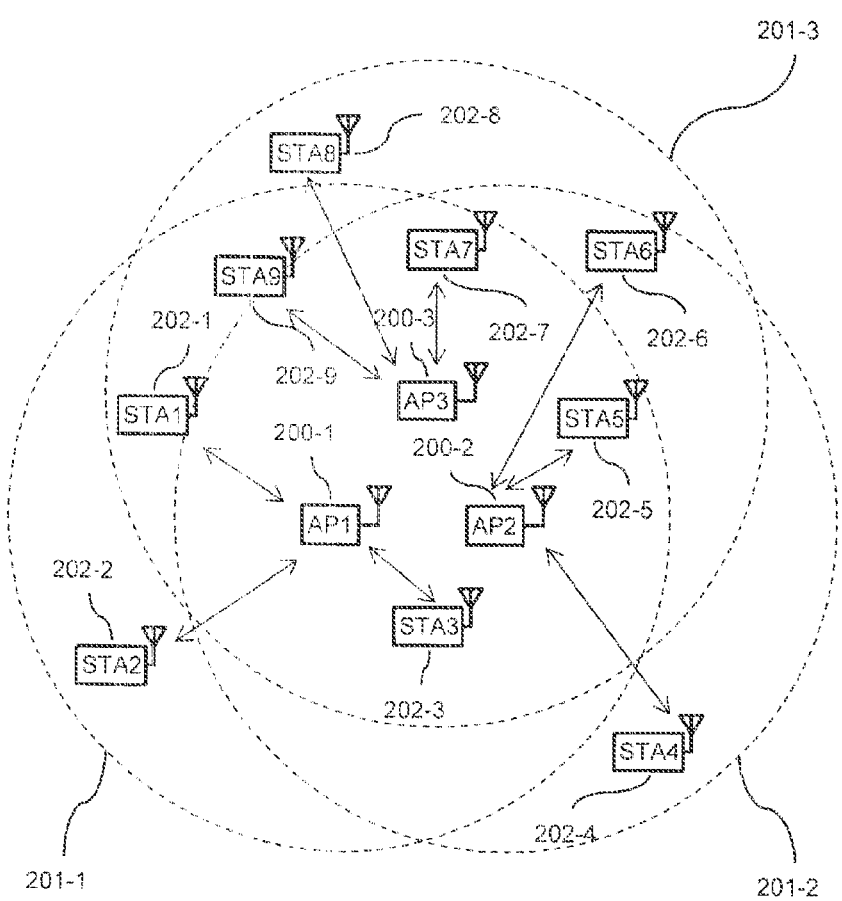
FIG. 2 is a diagram illustrating an exemplary wireless network configuration according to an embodiment of the invention.

FIG. 2 illustrates an exemplary wireless network configuration according to a first working example. The example illustrated therein depicts three access points (AP1 to AP3) 200-1 to 200-3 and corresponding communicable areas 201-1 to 201-3 constituted by the respective access points. Among nine wireless terminals (STA1 to STA9) 202-1 to 202-9, the wireless terminals (STA1 to STA3) 202-1 to 202-3 are wirelessly connected to the access point (AP1) 200-1, the wireless terminals (STA4 to STA6) 202-4 to 202-6 are wirelessly connected to the access point (AP2) 200-2, and the wireless terminals (STA7 to STA9) 202-7 to 202-9 are wirelessly connected to the access point (AP3) 200-3.

Figure 3:
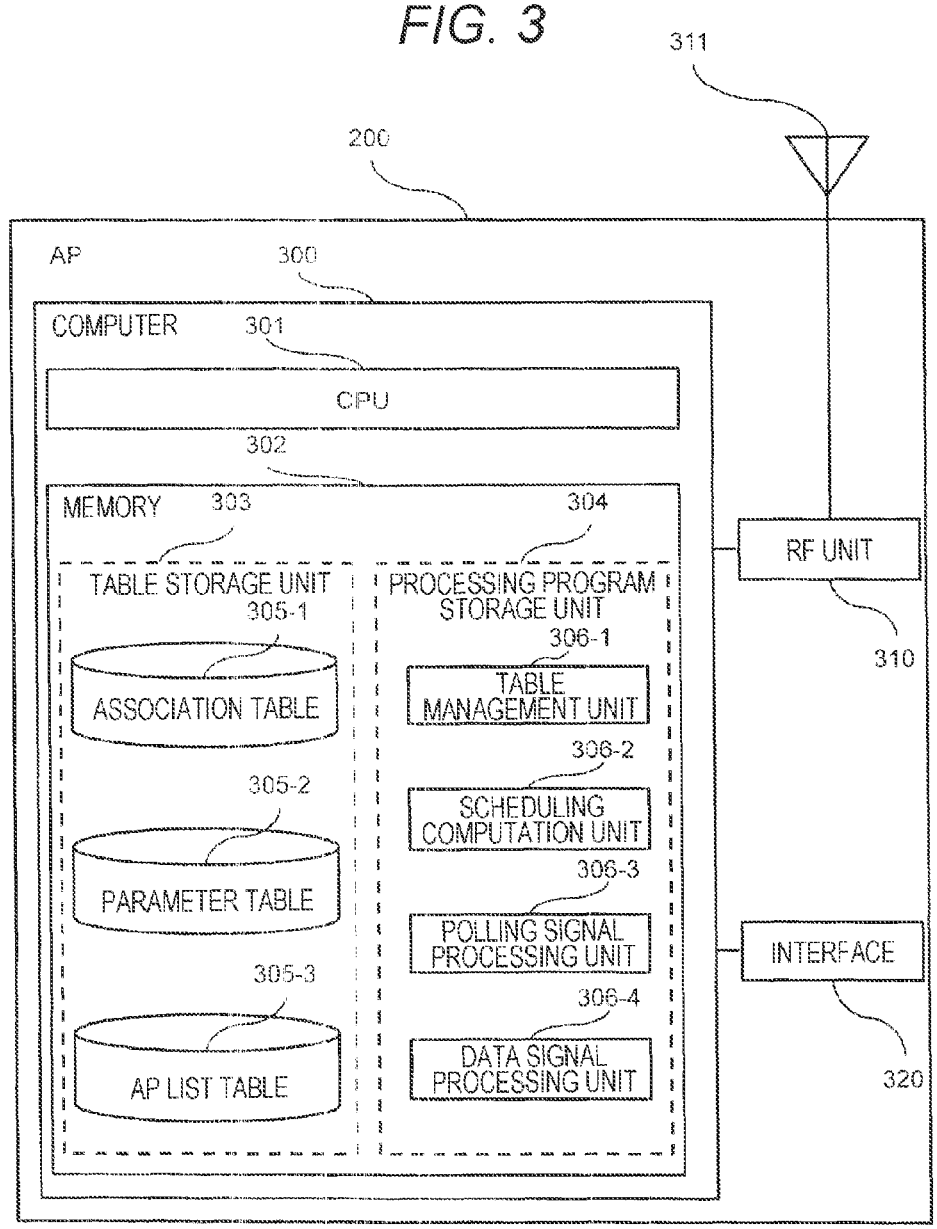
FIG. 3 is a block diagram illustrating an exemplary configuration of an access point according to the embodiment of the invention.

FIG. 3 illustrates an exemplary configuration of the wireless access point apparatus 200. The wireless access point apparatus 200 includes a computer 300, an RF unit 310, and an interface 320. The computer 300 which includes a CPU (processing unit) 301 and a memory 302 is connected to the RF unit 310 and the interface 320 to control communication. The RF unit 310 is connected to an antenna 311. The RF unit 310 is connected to the wireless terminal 202 through the antenna 311. The interface 320 is used to output data transmitted from the wireless terminal.

The memory 302 includes a table storage unit 303 and a processing program storage unit 304. The table storage unit 303 stores an association table 305-1, a parameter table 305-2, and an AP list table 305-3. The processing program storage unit 304 includes a table management unit 306-1, a scheduling computation unit 306-2, a polling signal processing unit 306-3, and a data signal processing unit 306-4 and favorably, all of these units are implemented as software. The CPU 301 operates in accordance with each of corresponding programs to thereby realize the functions of the respective units.

The parameter table 305-2 stores parameters required for each of processing (communication parameter information). The content of the parameters will be described later. The AP list table 305-3 stores information (channel usage) of an access point performing the polling communication before the own station. The association table 305-1 stores information of a wireless terminal connected to the wireless network constituted by the access point.

The table management unit 306-1 creates and updates the association table 305-1, the parameter table 305-2, and the AP list table 305-3 stored in the table storage unit 303. The scheduling computation unit 306-2 controls communication timing based on the association table 305-1, the parameter table 305-2, and the AP list table 305-3 stored in the table storage unit 303. The polling signal processing unit carries out processing for transmitting the polling communication signal to the wireless terminal 202 connected to the wireless network in accordance with the scheduling computation unit 306-2 as well as processing for receiving the polling communication signal transmitted from an access point 200 other than the own station. The data signal processing unit 306-4 carries out processing for transmitting/receiving data signal to/from the wireless terminal 202 connected to the wireless network constituted by the access point 200.

The operation of the wireless access point apparatus according to the embodiment will be described.

Figure 4:
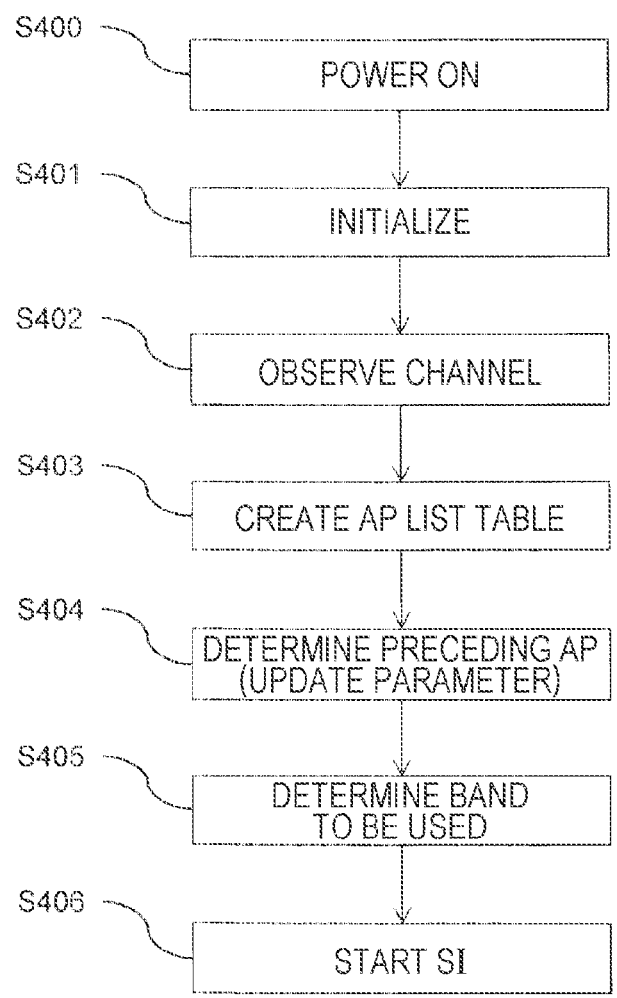
FIG. 4 is a sequence diagram illustrating exemplary operation until the access point starts an SI in the embodiment of the invention.

The operation of the access point 200 at startup will be described with reference to FIG. 4. Upon being turned on and started up (S400), the access point 200 begins an initialization step (S401) to initialize the parameters required for each of processing, which are stored in the parameter table 305-2, and select a channel to be used. The parameter 305-2 will be described later in each of the working examples. The access point 200 observes the channel (S402) for a predetermined period (channel observation period) to confirm whether another access point 200 performing the polling communication is present and based on a detection result, creates the AP list table 305-3 in accordance with the order of the access points 200 for which the polling communication signals are detected (S403). Based on the AP list table 305-3, the access point 200 determines an access point (preceding AP) that is to perform the polling communication immediately before the own station (S404) and determines a band to be used (S405). Once the series of operation described above is completed, a service interval (SI) is started (S406). The SI represents, for example, a cycle of a polling communication period.

Figure 5:
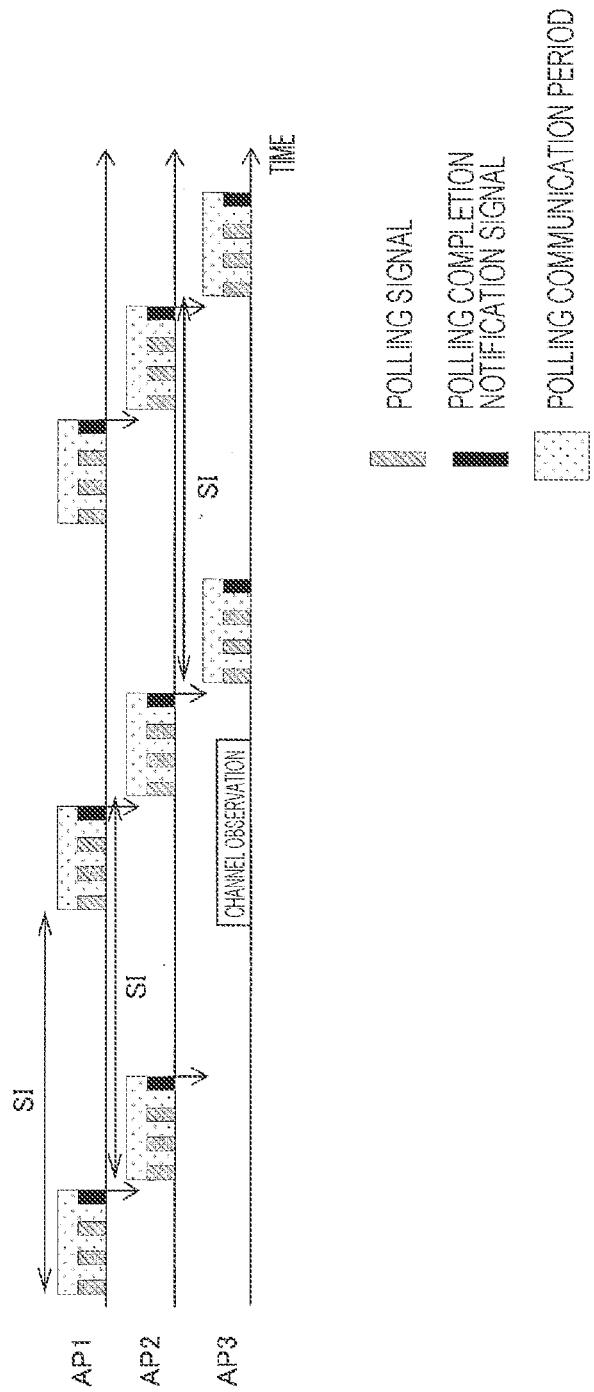
FIG. 5 is a timing chart illustrating exemplary polling communication according to the embodiment of the invention.

FIG. 5 illustrates a timing chart while the three access points (AP1 to AP3) 200-1 to 200-3 are performing the polling communication in accordance with the working example.

The operation at the startup of the SI will be detailed in the working example described later.

Hereinafter, the detailed operation according to the first working example will be described with reference to the drawings.

Figure 6:
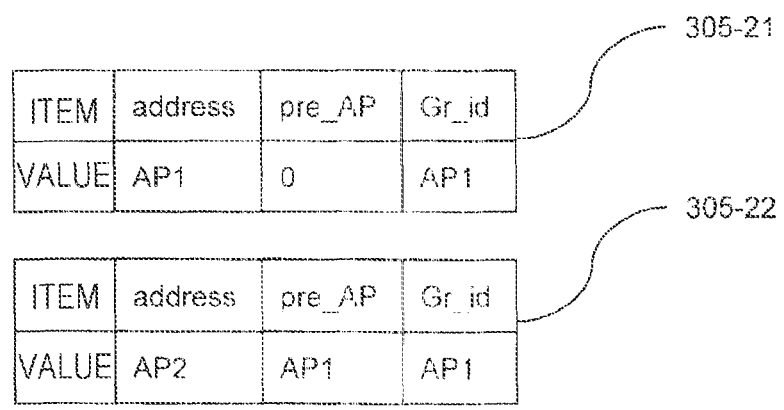
FIG. 6 illustrates an exemplary parameter table provided in the access point, which is required in a first working example.

FIG. 6 illustrates examples of the parameter tables 305-21 and 305-22 storing the parameters required for each of processing in the access points (AP1 and AP2) 200-1 and 200-2, respectively. Address information of the own station is stored in address, whereas information on the preceding AP is stored in pre_AP. Gr_id is group information indicating which group the own station belongs to and here stores the address information of the access point positioned at the top of the group. Among this information, each of the access points includes information on address and Gr_id of the own station into the polling communication signal to transmit. FIG. 6 illustrates values in the parameter tables of the respective access points while the AP3 that has been turned on is observing the channel when the AP1 and the AP2 are performing the polling communication in this order as illustrated in FIG. 5. In the example in FIG. 5, because the AP1 has no access point performing the polling communication before the own station, the AP1 individually stores a value of zero to pre_AP and a value of the address of the AP1 to Gr_id in the parameter table 305-21, which values mean that the own station is positioned at the top of the group and no preceding AP is present. On the other hand, the AP2 is performing the polling communication subsequently to the AP1 and thus, updates the information on Gr_id of the own station based on the information on Gr_id contained in the polling communication signal transmitted from the AP1. Accordingly, as for the values in the parameter table of the AP2, a value of the address of the AP1 is stored to pre_AP and a value of the address of the AP1 is stored to Gr_id individually in the parameter table 305-22.

Figure 7:
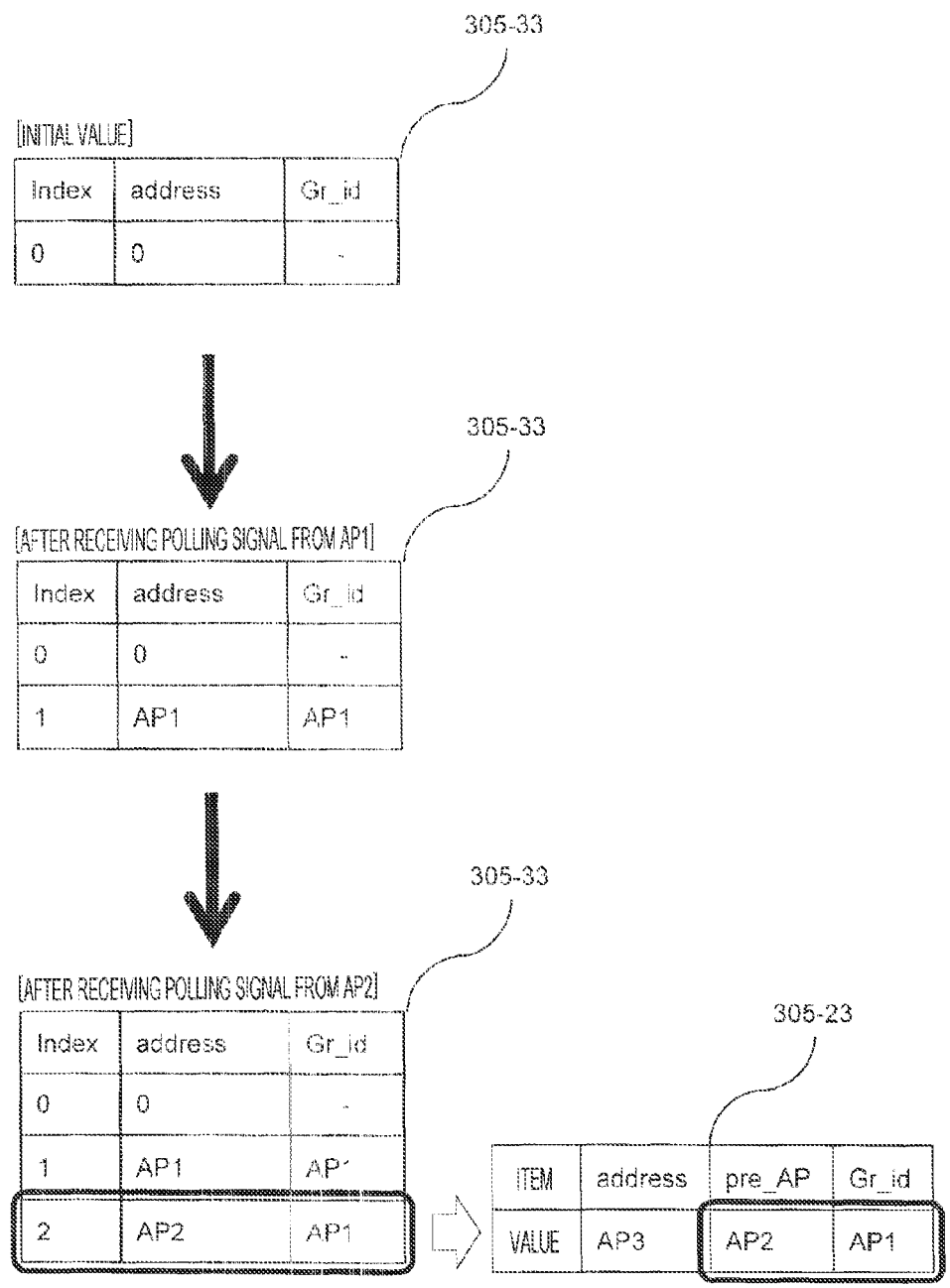
FIG. 7 illustrates an AP list table required in the first working example and an example where a preceding AP is determined based on the AP list table and then the parameter table is updated.

The AP list table 305-33 detected by the access point (AP3) 200-3 in FIG. 5 is illustrated on the left side of FIG. 7. This table is configured by information contained in the polling communication signals transmitted from the two access points (AP1 and AP2) 200-1 and 200-2. The AP list table 305-33 stores information on the address (address) and the group information (Gr_id) of the access point, which are contained in the polling communication signal from another station. Upon receiving the polling communication signal from the AP1, the AP3 stores the information on address and Gr_id contained in the polling communication signal from the AP1 to a second row (index=1) of the AP list table 305-33. Subsequently, upon receiving the polling communication signal from the AP2, the AP3 stores the information on address and Gr_id contained in the polling communication signal from the AP2 to a third row (index=2) of the AP list table 305-33. As described above, the AP list table 305-33 stores the information in accordance with the order of detecting the polling communication signals. Accordingly, information on the access point in the last row is determined as the preceding AP of the access point 200-3. How the parameter table 305-23 for the access point 200-3 is generated from the AP list table 305-33 is illustrated on the right side of FIG. 7. Upon completing the channel observation, the access point 200-3 sets, as the preceding AP (pre_AP), the access point (AP2) 200-2 at the lowest of the AP list table 305-33, for which the polling communication signal is detected at the last time. Meanwhile, as for the group information (Gr_id), the same value as that of the AP2 serving as the preceding AP is stored to the parameter table 305-23.

Figure 8:
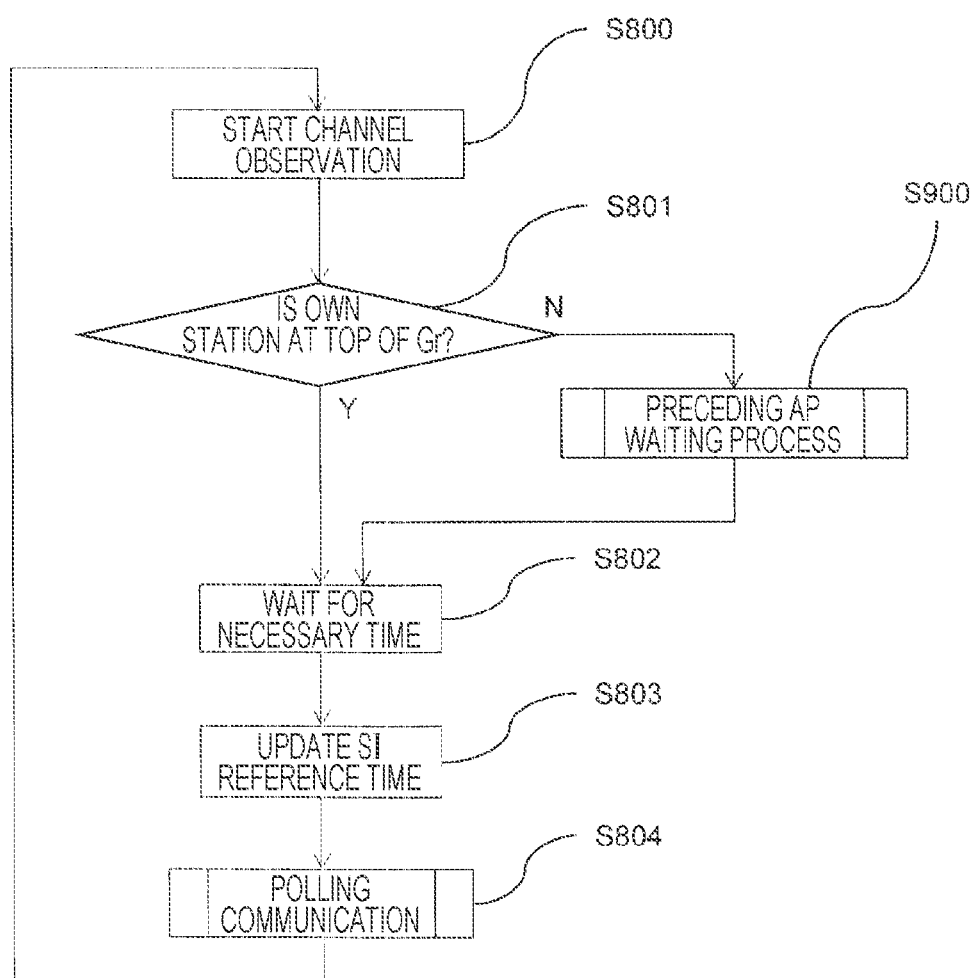
FIG. 8 is a diagram illustrating exemplary operation of the access point after the SI is started in the first working example.

FIG. 8 illustrates an operation flow of the access point at the startup of the SI. The access point observes a channel until starting the SI (S800). When the own station is at the top of the group (S801: Y), the access point waits for a necessary time T1 (S802) and thereafter, updates a start timer of the SI to be started next (S803). Subsequently, the polling communication is started (S804). The access point can determine that the own station is at the top of the group, for example, by referring to the parameter table and finding that pre_AP is zero. Alternatively, the access point may make such determination when no polling communication signal is received from another station for the necessary time T1. When the own station is not at the top of the group (S801: N), the access point waits until the preceding AP is determined to have completed the polling communication (preceding AP waiting process) (S900). After determining that the preceding AP has completed the polling communication, the access point waits for a necessary time T2 (S802) and thereafter, updates the start timer of the SI to be started next (S803). Subsequently, the polling communication is started (S804). At this time, the SI has started and thus, the channel observation has been completed. The series of operation described above is repeated until the completion. The waiting times T1 and T2 are usually set so as to have the relationship of T1≥T2 and, for example, interframe spaces standardized in IEEE802.11, namely, a PCF interframe space (PIFS) and a short interframe space (SIFS) are used for the waiting times T1 and T2, respectively.

Figure 9:
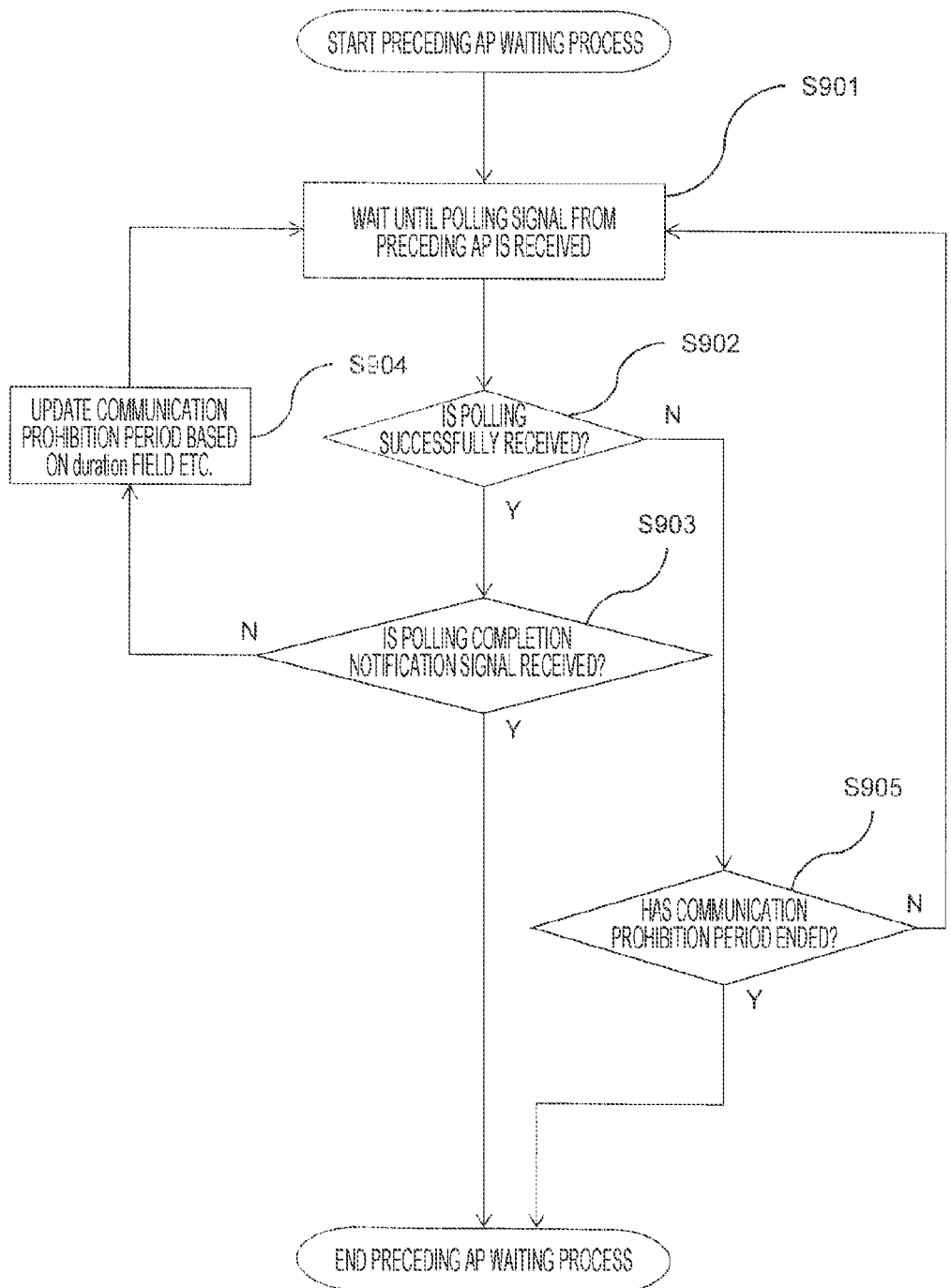
FIG. 9 is a diagram illustrating exemplary operation of the access point during a preceding AP waiting process in the first working example.

FIG. 9 illustrates an operation flowchart for the preceding AP waiting process (S900). The access point waits until the polling communication signal transmitted from the preceding AP is received (S901). When the polling communication signal is successfully received (S902: Y), in a case where the received polling communication signal is not a polling completion notification signal (S903: N), the access point updates a communication prohibition period obtained from information specifying a polling communication prohibition period in a duration field or the like contained in the polling communication signal (S904), and then, waits until the subsequent polling communication signal transmitted from the preceding AP is received (S901). In a case where the polling communication signal is successfully received (S902: Y) and the received polling communication signal is the polling completion notification signal (S903: Y), the access point determines that the polling communication period of the preceding AP has ended and accordingly, terminates the preceding AP waiting process. When the reception of the polling communication signal transmitted from the preceding AP is failed (S902: N), in a case where the updated communication prohibition period has ended (S905: Y), the access point determines that the polling communication period of the preceding AP has ended and accordingly, terminates the preceding AP waiting process. In a case where the communication prohibition period has not ended (S905: N), the access point waits until the subsequent polling communication signal transmitted from the preceding AP is received (S901).

According to the working example, each of the plurality of access points observes the usage of a channel prior to starting the polling communication to determine which access point to follow when performing the polling communication in the own network (preceding AP). Upon determining the preceding AP, the access point starts the polling communication period of the own station after the preceding AP has ended the polling communication period. The access point according to the working example controls a period for performing the polling communication depending on a communication state. As a result, a signal collision among the plurality of access points can be avoided. Additionally, even in a case where the reception of the polling completion notification signal transmitted from the preceding AP is failed, the transmission prohibition period is updated based on the duration field contained in the polling communication signal transmitted prior thereto. Consequently, whether the preceding AP has ended the polling communication period can be determined more surely.

Second Working Example

Hereinafter, a second working example according to the invention will be described with reference to the drawings.

In the working example, a configuration of the access point, configurations of the parameters stored in respective tables 305-1 to 305-3 provided in a table storage unit 303, information to be included into the polling communication signal, and operation until starting the SI are similar to those in the first working example.

A wireless network configuration according to the working example assumes a case where three access points (AP1 to AP3) 200-1 to 200-3 are divided into groups, namely, a group of the AP1 and the AP2 in this order and a group of the AP3, where the respective groups individually start the polling communication periods and then, the access point 200-3 moves such that the three access points 200-1 to 200-3 are positioned in a closer distance allowing the communication with each other (FIG. 2).

Figure 10:
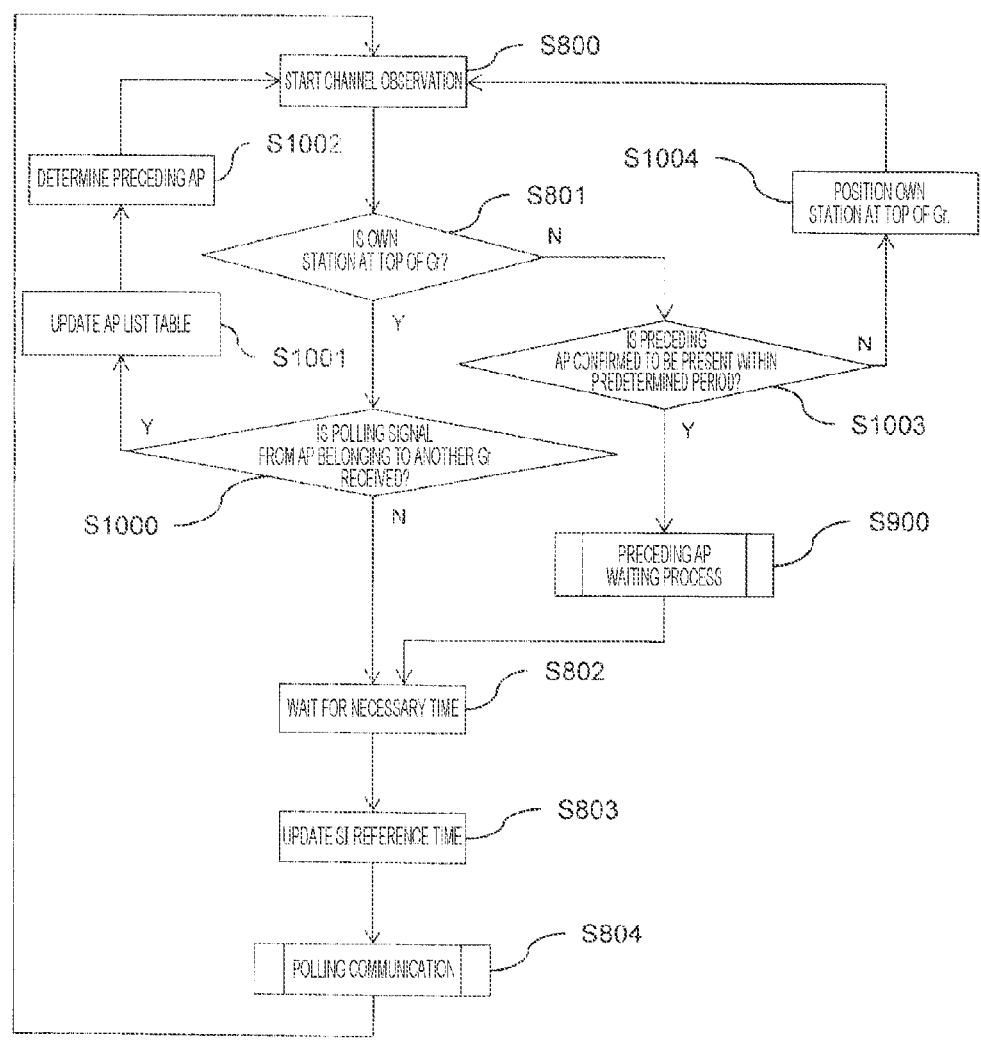
FIG. 10 is a diagram illustrating exemplary operation of the access point after the SI is started in a second working example.

FIG. 10 illustrates an operation flow of the access point at the startup of the SI. FIG. 10 is a substitute of the operation of the access point at the startup of the SI illustrated in FIG. 8 in the first working example. Other operation steps illustrated in FIG. 8 have been described in the aforementioned working example (refer to the descriptions for the steps with the same reference numerals in FIG. 8) and thus, the descriptions thereof are omitted here. The access point observes a channel until starting the SI (S800). When the own station is at the top of the group (S801: Y), in a case where the polling communication signal from an access point belonging to another group is not received (S1000: N), the access point waits for the necessary time (PIFS or the like) (S802) and thereafter, updates the start timer of the SI to be started next (S803). Subsequently, the polling communication is started (S804). On the other hand, in a case where the polling communication signal from an access point belonging to another group is received (S1000: Y), the access point updates the AP list table (S1001) and determines the preceding AP (S1002). Meanwhile, when the own station is not at the top of the group (S801: N), in a case where the preceding AP can be confirmed to be present through the reception of the polling communication signal from the preceding AP within a predetermined period (S1003: Y), the access point waits until the preceding AP is determined to have completed the polling communication (preceding AP waiting process) (S900). After determining that the preceding AP has completed the polling communication, the access point waits for the necessary time (SIFS or the like) (S802) and thereafter, updates the start timer of the SI to be started next (S803). Subsequently, the polling communication is started (S804). At this time, the SI has started and thus, the channel observation has been completed. In a case where the preceding AP cannot be confirmed to be present (S1003: N), the access point determines that the preceding AP is no longer present nearby and positions the own station at the top of the group (S1004). Thereafter, the access point updates the parameter table and observes the channel until starting the SI (S800).

Figure 22:
FIG. 22 illustrates an AP list table required in the second working example and an example where the preceding AP is determined based on the AP list table and then a parameter table is updated.

FIG. 22 illustrates the AP list table required in the second working example and an example where the preceding AP is determined based on the AP list table and then the parameter table is updated. Hereinafter, the update of the AP list table (S1001) in a case where the AP3 approaches the AP1 and the AP2 after the polling communication has been started as illustrated in FIG. 5 in the second working example will be described (a similar procedure as that in FIG. 7). In an [initialization] state, upon receiving the polling signal from another polling group (S1000: Y), the AP3 initializes the AP list table as indicated in [after receiving polling signal from AP1] and [after receiving polling signal from AP2] to re-create (update) (305-33). Subsequently, the AP3 updates the parameter table of the own station as illustrated in the drawing (305-23).

Specifically, for example, the access point adds the polling communication signal from another AP to the AP list table to update in step S1001 and then updates the parameter table of the own AP using the address information and the group information of the another AP contained in the polling communication signal from the another AP as the address information of the preceding AP and the group information of the own AP, respectively, thereby making the own AP join the another group.

Additionally, for example, the access point updates the preceding AP and the group in the parameter table of the own station in step S1004 such that the preceding AP and the group represent the top position.

According to the working example, even in a case where the preceding AP is dynamically changed depending on a change in the communication state after the SI has been started, the respective access points can autonomously share the polling communication period while avoiding the signal collision.

Third Working Example

Hereinafter, a third working example according to the invention will be described with reference to the drawings.

In the working example, a configuration of the access point and operation until starting the SI are similar to those in the first working example. Configurations of the parameters stored in respective tables 305-1 to 305-3 provided in a table storage unit 303 and information to be included into the polling communication signal will be described later.

Figure 11:
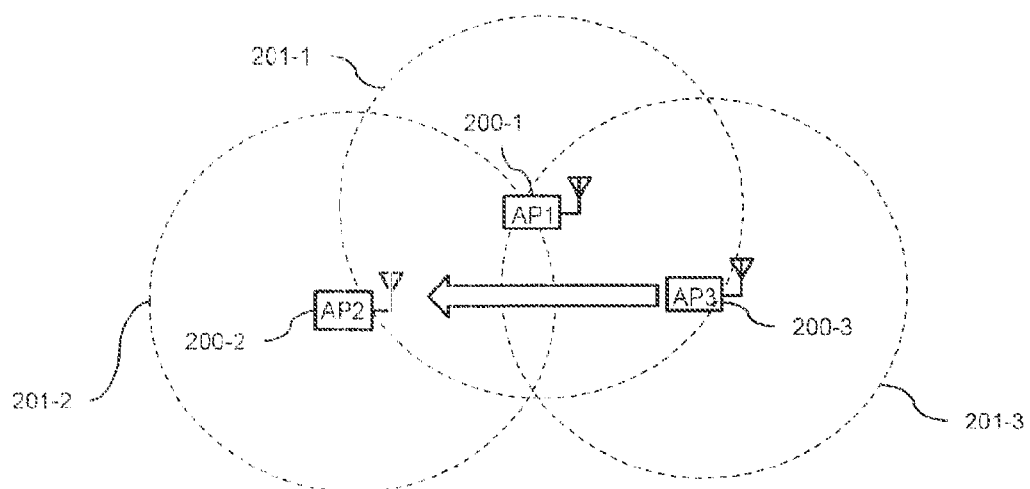
FIG. 11 is a diagram illustrating an exemplary wireless network configuration according to a third working example.

FIG. 11 illustrates a wireless network state assumed in the working example. A situation is depicted therein in which an access point 200-2 and an access point 200-3 are positioned in a distance in which signals from both of the access points do not reach each other when the respective access points 200-1 to 200-3 start the polling communication; thereafter, the distance between the two access points 200-2 and 200-3 becomes shorter through the movement thereof or the like at a time $t_1$ such that the signals from both of the access points reach each other.

In the working example, the polling communication signal transmitted from each of the access points 200-1 to 200-3 contains information on the access point including the address (address), the preceding AP (pre_AP), and Gr_id.

The operation of the respective access points while the three access points (AP1 to AP3) 200-1 to 200-3 are performing the polling communication in accordance with the working example will be described with reference to a timing chart in FIG. 12. As illustrated in FIG. 11, a case is assumed to start from a situation in which the access point 200-2 and the access point 200-3 have a positional relationship not allowing the signals from both of the access points to be received from each other. Accordingly, the two access points 200-2 and 200-3 are performing the polling communication in parallel by determining the access point 200-1 as the preceding AP. The operation continues until the two access points 200-2 and 200-3 are positioned in a closer distance through the movement thereof and the signals from both of the access points can be received from each other at the time $t_1$. After the time $t_1$, the access point 200-1 at the top position completes the polling communication and thereafter, the two access points 200-2 and 200-3 start the polling communication. At this time, the access point 200-3 fails to transmit the polling communication signal or receive a signal from the wireless terminal due to the collision of the polling communication signals. Here, the wireless terminals 202-1 to 202-9 are omitted for simplification.

In the working example, the AP list table 305-3 stores information on the access point in regard to the address (address), the preceding AP (pre_AP), and the group information (Gr_id) contained in the polling communication signal. The AP list table 305-3 stores the information in accordance with the order of detecting the polling communication signals. Accordingly, information on the access point in the last row is determined as the preceding AP.

Figure 12:
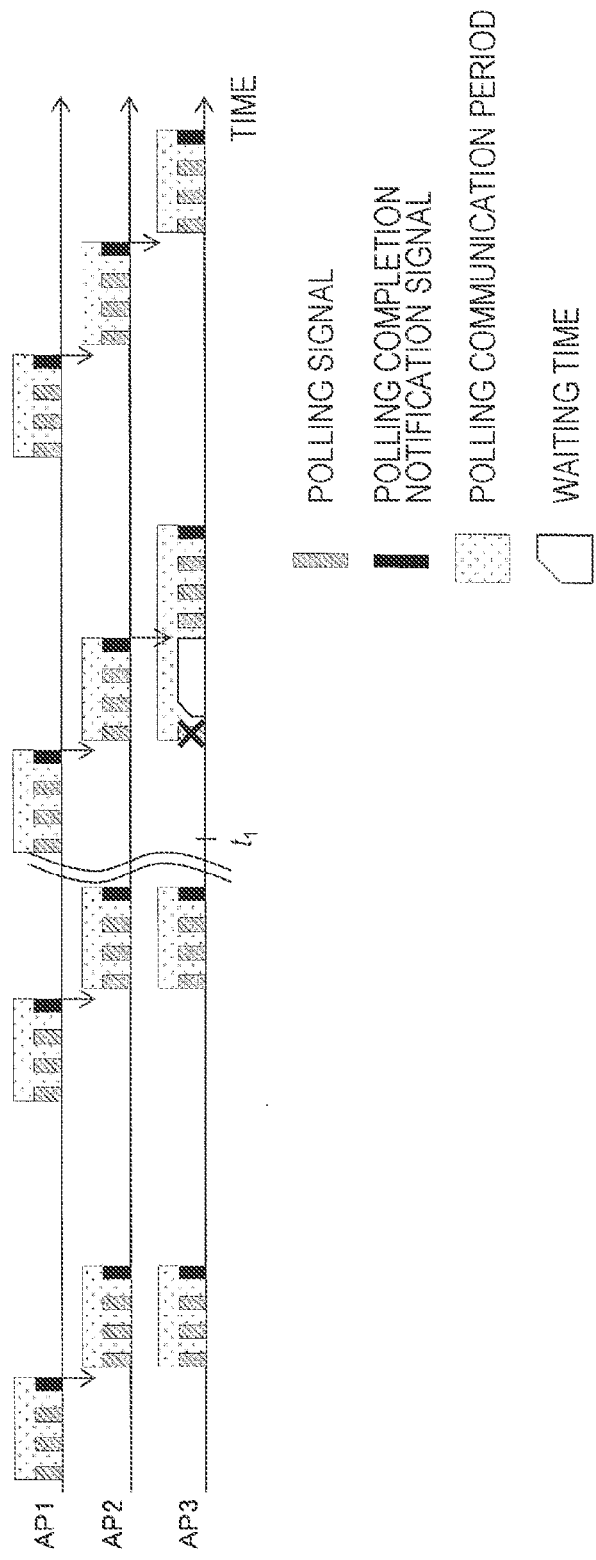
FIG. 12 is a timing chart illustrating exemplary polling communication according to the third working example.

FIG. 13 illustrates the AP list tables 305-32 and 305-33 and the parameter tables 305-22 and 305-23 of the access points 200-2 and 200-3, respectively, while the polling communication is being performed before the time $t_1$ in the order from the AP1 to the AP2 and in the order from the AP1 to the AP3 as illustrated in FIG. 12. In the parameter tables 305-22 and 305-23, upon completing the channel observation, the two access point 200-2 and 200-3 set, as the preceding AP (pre_AP), the access point at the lowest of the AP list table, for which the polling communication signal is detected at the last time, while storing, to Gr_id, the same value as that of the AP1 serving as the preceding AP. Methods for creating the AP list tables 305-32 and 305-33 and the parameter tables 305-22 and 305-23 of the access points 200-2 and 200-3, respectively, are similar to those described in FIG. 7 and thus, the descriptions thereof are omitted here.

In a state illustrated in FIG. 13, it is assumed that the access point 200-2 transmits the polling communication signal after the time $t_1$, while the access point 200-3 fails to transmit the polling communication signal and receives the polling communication signal from the access point 200-2.

Figure 14:
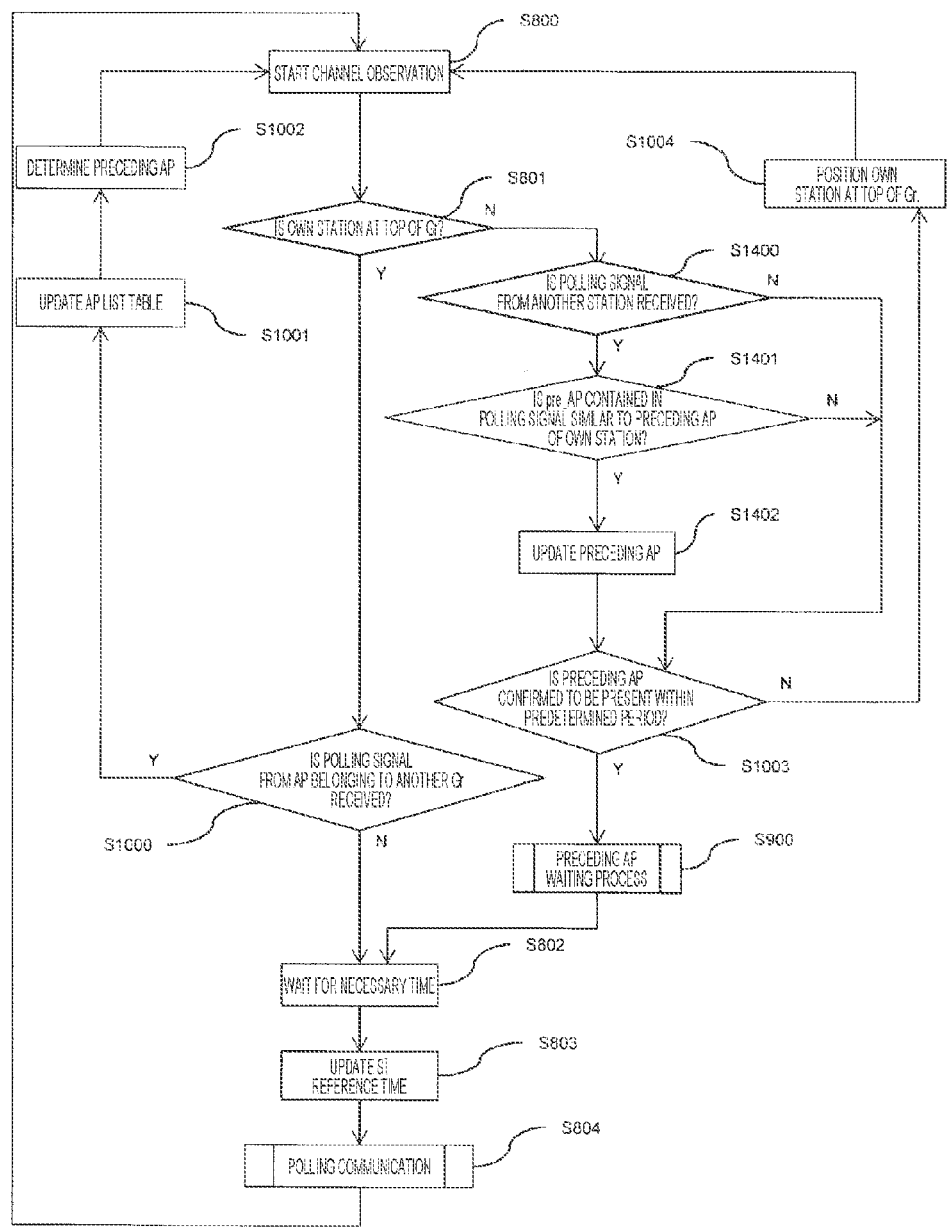
FIG. 14 is a diagram illustrating exemplary operation of the access point after the SI is started in the third working example.

An operation flow of the access point 200 at the startup of the SI according to the working example will be described with reference to FIG. 14. FIG. 14 is a substitute of the operation of the access point at the startup of the SI illustrated in FIG. 8 in the first working example. The access point observes a channel until starting the SI (S800). When the access point is not at the top of the group (S801: N), in a case where the access point receives the polling communication signal from another access point (S1400: Y) and the preceding AP (pre_AP) contained in this polling communication signal is similar to the information on the preceding AP (pre_AP) stored in the parameter table of the own station (S1401: Y), the access point changes the preceding AP to the address of the access point that has transmitted the polling communication signal (S1402). The information on the preceding AP is not changed unless both of the conditions are satisfied (S1400: N or S1401: N). After completing the processing for updating the preceding AP, the access point waits until the preceding AP is determined to have completed the polling communication (preceding AP waiting process) (S900). After determining that the preceding AP has completed the polling communication, the access point waits for the necessary time (SIFS) (S802) and thereafter, updates the start timer of the SI to be started next (S803). Subsequently, the polling communication is started (S804). At this time, the SI has started and thus, the channel observation has been completed. Other operation steps illustrated in FIG. 14 have been described in the aforementioned working examples (refer to the descriptions for the steps with the same reference numerals in FIG. 8 and FIG. 10) and thus, the descriptions thereof are omitted here.

After the time $t_1$ in FIG. 12, the access point updates the AP list table and the parameter table in step S1402 as described below as an example.

Figure 23:
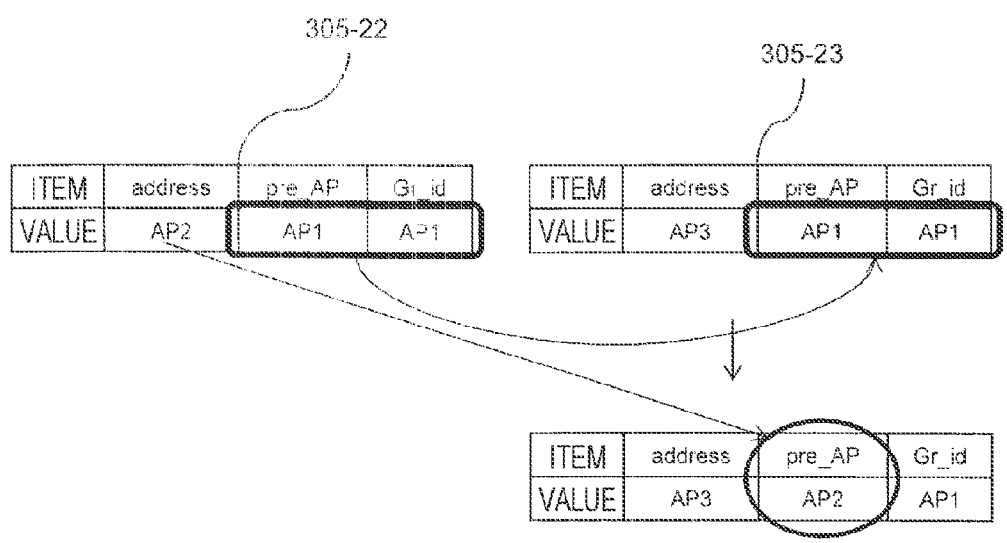
FIG. 23 illustrates the AP list table required in the third working example and an example where the preceding AP is determined based on the AP list table and then a parameter table is updated.

FIG. 23 illustrates the AP list table required in the third working example and an example where the preceding AP is determined based on the AP list table and then the parameter table is updated. Hereinafter, the operation according to the third working example when the AP3 receives the polling signal from the AP2 after the time $t_1$ in FIG. 12 will be described. The polling signal contains information on address, pre_AP, and Gr_id. In the working example, only pre_AP is updated and Gr_id is not updated. Accordingly, the AP list table is not updated (re-created). The AP3 compares the information contained in the polling signal from the AP2 (305-22) and the value in the parameter table of the own station (305-23). In this example, the values in pre_AP are similar to each other and thus, the AP3 updates the information on pre_AP in the parameter table of the own station.

According to the working example, in a case where cutting-in of an access point following the same preceding AP occurs, the preceding AP is updated, whereby the signal collision can be avoided.

Fourth Working Example

Hereinafter, a fourth working example according to the invention will be described with reference to the drawings.

In the working example, a configuration of the access point and operation until starting the SI are similar to those in the first working example. Configurations of the parameters stored in respective tables 305-1 to 305-3 provided in a table storage unit 303 and information to be included into the polling communication signal will be described later.

Figure 15:
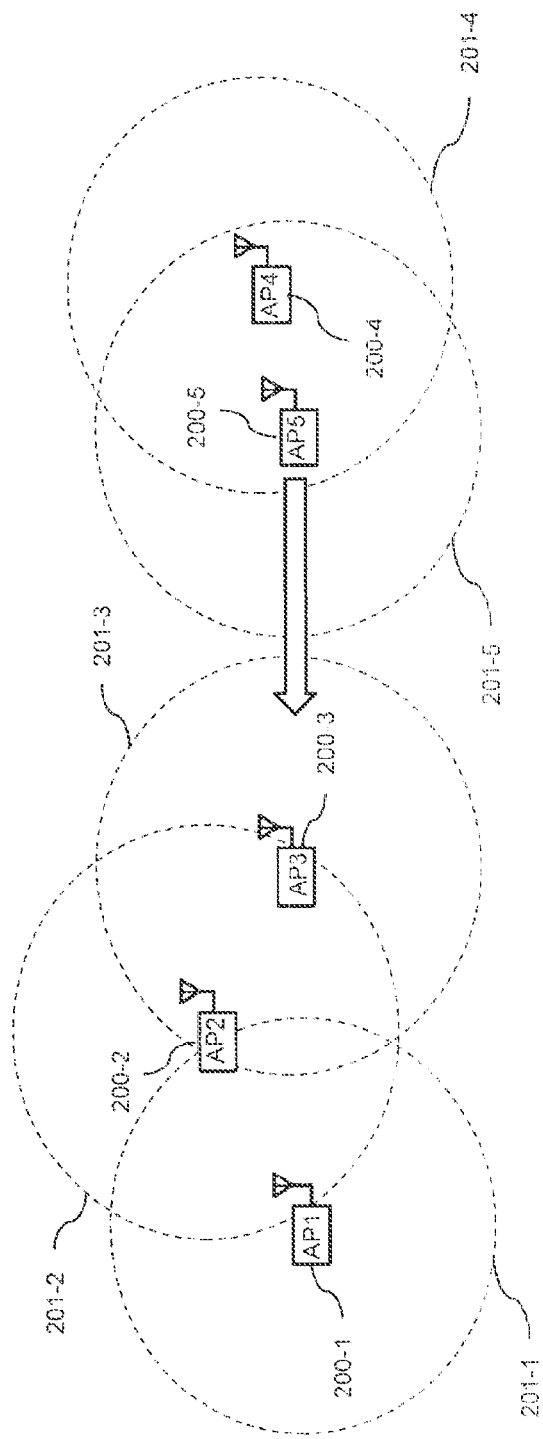
FIG. 15 is a diagram illustrating an exemplary wireless network configuration according to a fourth working example.

FIG. 15 illustrates a wireless network state assumed in the working example. FIG. 15 depicts a situation in which three access points 200-1 to 200-3 form a group for the polling communication whereas two access points 200-4 and 200-5 form another group; the access points in the two groups are positioned in a distance in which signals from both of the groups do not reach each other and thereafter, a distance between the two access points 200-3 and 200-5 becomes shorter through the movement thereof or the like such that the signals from both of the access points reach each other.

Figure 17:
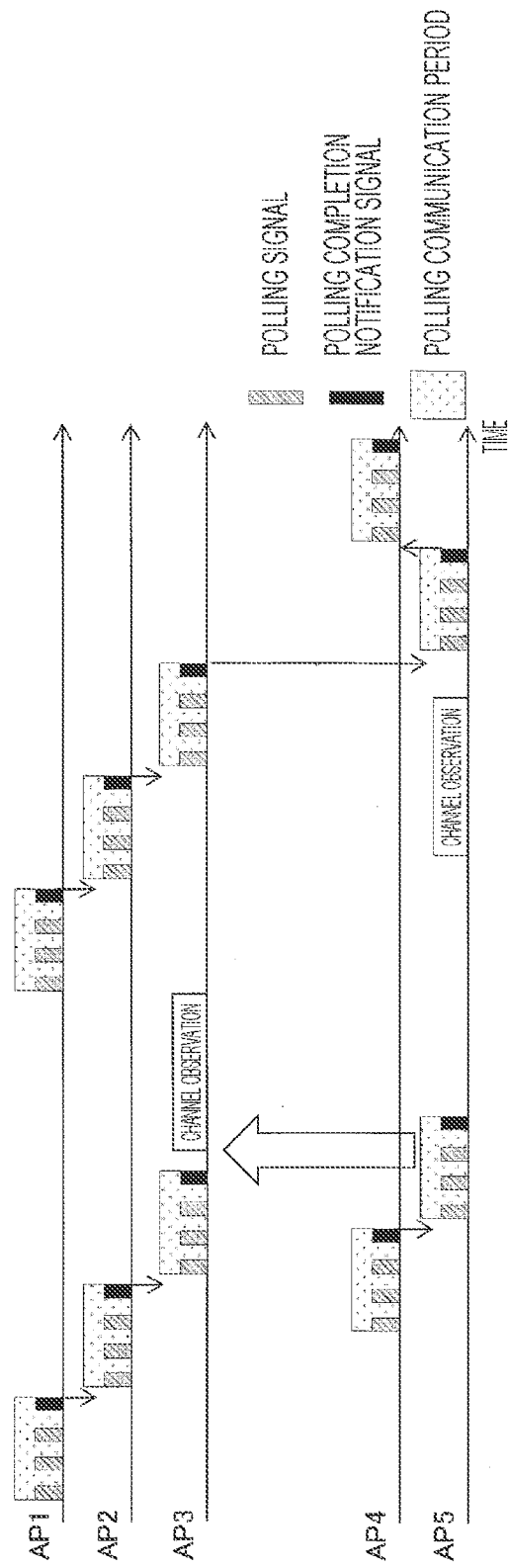
FIG. 17 is a timing chart illustrating exemplary polling communication according to the fourth working example.

FIG. 16 illustrates examples of parameter tables 305-21 to 305-25 storing the parameters required for the access points (AP1 to AP5) 200-1 to 200-5, respectively, to carry out the invention. A method for creating the parameter tables 305-21 to 305-25 of the access points 200-1 and 200-5, respectively, is similar to that described in FIG. 7 and thus, the description thereof is omitted here. The address information of the own station is stored in address, whereas the information on the preceding AP is stored in pre_AP. Gr_id indicates which group the own station belongs to and here stores the address information of the access point positioned at the top of the group. NO_AP stores information indicating how many access points are queued within the group to perform the polling communication before the own station starts the polling communication, while coll_th stores information indicating an upper limit of the number of times of successive retransmission when the transmission of the polling communication signal is successively failed. For example, this means that it is determined that a signal collision with another access point has occurred when the transmission of the polling communication signal is failed coll_th times in a row. Among this information, information on address, Gr_id, and NO_AP is included into the polling communication signal to be transmitted. FIG. 16 illustrates values in the parameter tables 305-21 to 305-25 while the polling communication is being performed in the two groups separately in the order from the AP1 to the AP2 to the AP3 and in the order from the AP3 to the AP4 as illustrated in FIG. 17. As an exemplary method for determining NO_AP, NO_AP can be given by storing a value obtained by adding one to NO_AP contained in the polling communication signal transmitted from the preceding AP. Meanwhile, coll_th can be given depending on the communication state and, for example, is determined in accordance with the value of NO_AP. In FIG. 16, coll_th is given such that the access point positioned closer to the top of the group has a larger value.

As will be described hereinafter, FIG. 17 illustrates an exemplary timing chart in a case where a distance between the two access points (the AP3 and the AP5) belonging to different groups from each other and not positioned at the tops of the groups becomes shorter through the movement thereof.

Figure 18:
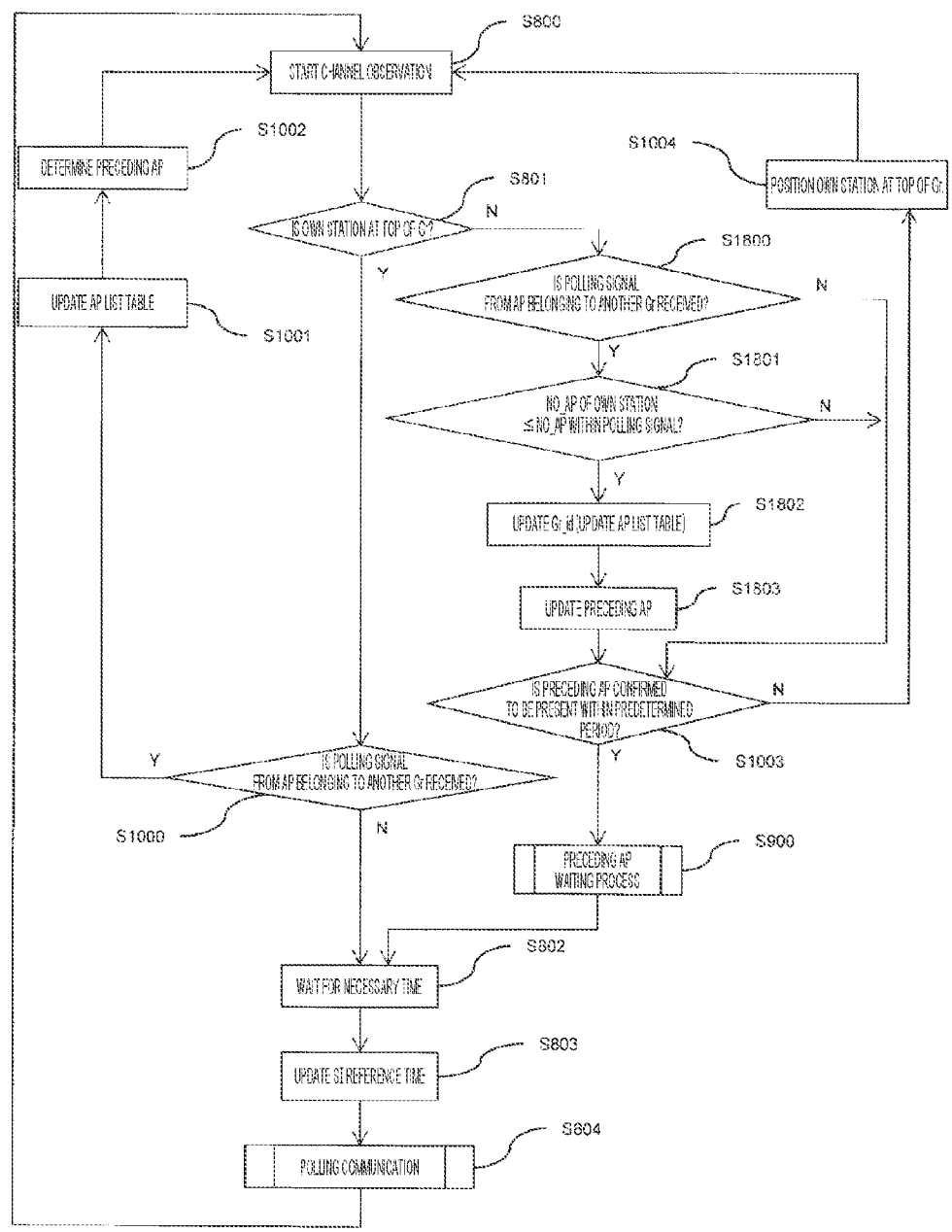
FIG. 18 is an operation flow of the access point in the polling communication configured for the access points belonging to different groups from each other and following the preceding AP to individually carry out collision avoidance processing in the fourth working example.

FIG. 18 illustrates an operation flow of the access point 200 at the startup of the SI according to the working example. FIG. 18 is a substitute of the operation of the access point at the startup of the SI illustrated in FIG. 8 in the first working example. The access point 200 observes a channel until starting the SI (S800). When the access point is not at the top of the group (S801: N), in a case where the access point receives the polling communication signal from an access point belonging to another group (S1800: Y) and NO_AP contained in the polling communication signal has a larger value than a value of NO_AP of the own station (S1801: Y), the access point updates the group to which the own station belongs and the preceding AP (pre_AP) in the AP list table (S1802 and S1803). After updating the information, the access point waits until the preceding AP is determined to have completed the polling communication (preceding AP waiting process) (S900). After determining that the preceding AP has completed the polling communication, the access point waits for the necessary time (SIFS) (S802) and thereafter, updates the start timer of the SI to be started next (S803). Subsequently, the polling communication is started (S804). At this time, the SI has started and thus, the channel observation has been completed. Other operation steps illustrated in FIG. 18 have been described in the aforementioned working examples and thus, the descriptions thereof are omitted here. In addition, operation step S1801 may not be carried out. Other operation steps illustrated in FIG. 18 have been described in the aforementioned working examples (refer to the descriptions for the steps with the same reference numerals in FIG. 8, FIG. 10, and FIG. 14) and thus, the descriptions thereof are omitted here.

FIG. 17 illustrates a timing chart when the AP3 observes a channel in accordance with the operation flow in FIG. 18 after it has been made possible for the AP3 to receive the polling communication signal from the AP5. Because NO_AP of the AP3 has a larger value than a value of NO_AP of the AP5, the group and the preceding AP are not updated. Thereafter, the AP5 similarly observes a channel in accordance with the operation flow in FIG. 18 after it has been made possible for the AP5 to receive the polling communication signal from the AP3. Because NO_AP of the AP5 has a smaller value than a value of NO_AP of the AP3, the group information (Gr_id) is updated to the address of the AP1 and the preceding AP is updated to the address of the AP3. The AP4 also operates similarly; that is, the group information (Gr_id) is updated to the address of the AP1 and the preceding AP is updated to the address of the AP5. With the operation described above, even in a case where a collision of the access points following the preceding APs occurs between groups, the signal collision can be avoided.

Figure 24:
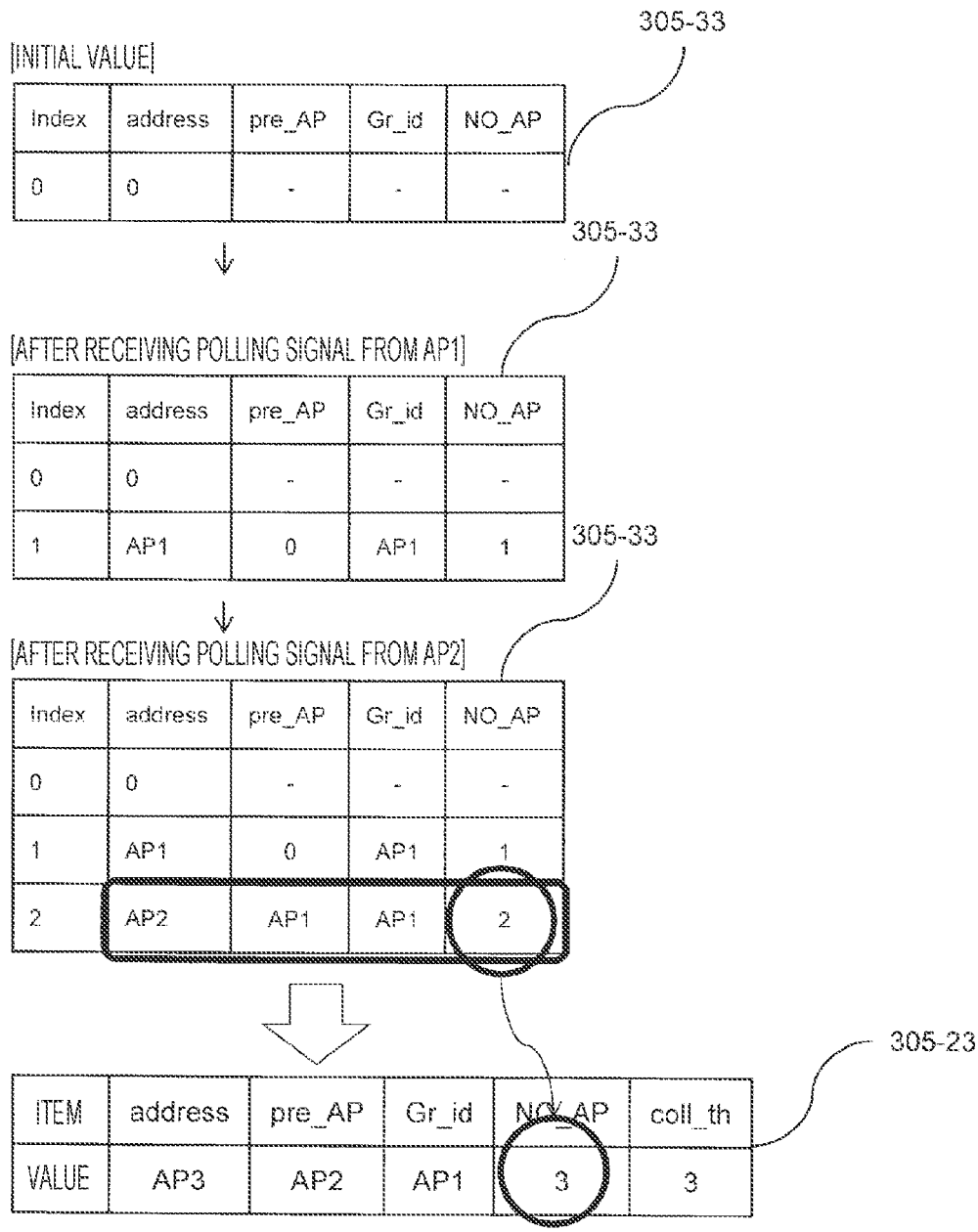
FIG. 24 illustrates an AP list table required in the fourth working example and an example (1) where the preceding AP is determined based on the AP list table and then the parameter table is updated.

FIG. 24 illustrates the AP list table required in the fourth working example and an example (1) where the preceding AP is determined based on the AP list table and then the parameter table is updated. Hereinafter, the update of the AP list table when the AP3 forms a polling group with the AP1 and the AP2 after the polling communication has been started as illustrated in FIG. 17 in the fourth working example will be described. As illustrated in the drawing, the AP3 updates the AP list table as indicated in [initial value], [after receiving polling signal from AP1], and [after receiving polling signal from AP2] in this order (305-33). Additionally, the AP3 updates the parameter table by adding one (+1) to the information on NO_AP contained in the polling signal from the AP2 (305-23). The AP3 also uniquely determines coll_th depending on the value of NO_AP to update.

Figure 25:
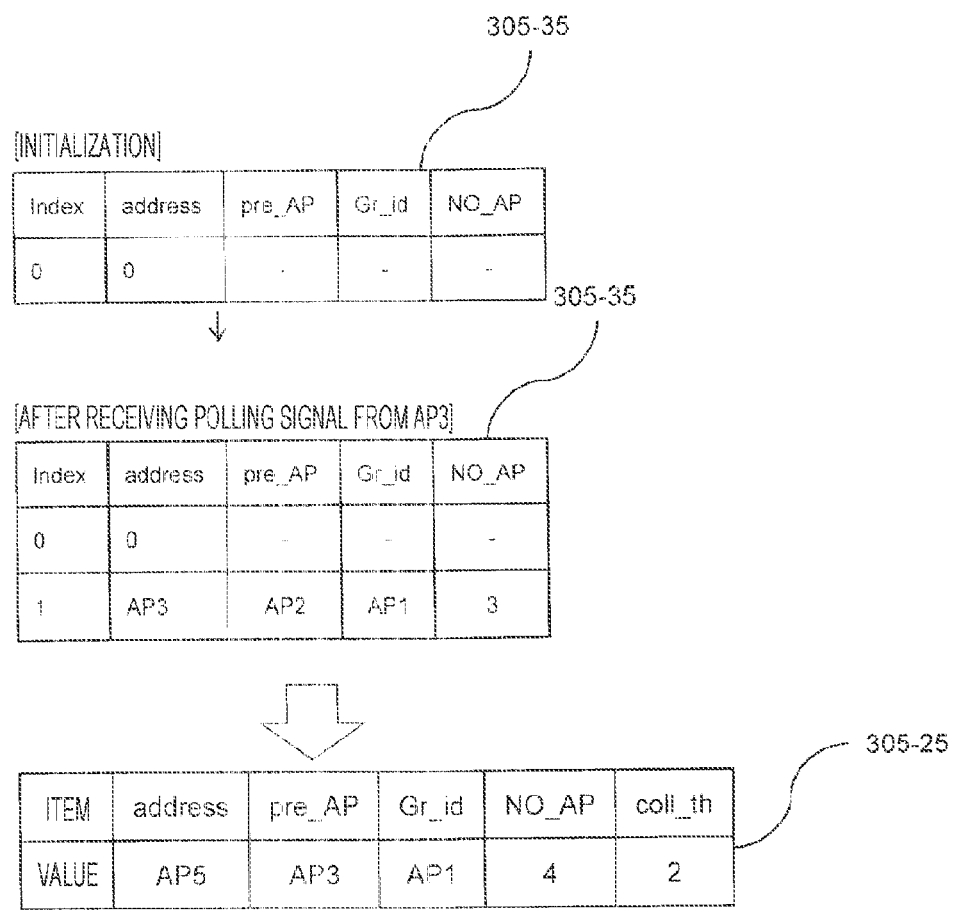
FIG. 25 illustrates the AP list table required in the fourth working example and an example (2) where the preceding AP is determined based on the AP list table and then the parameter table is updated.

FIG. 25 illustrates the AP list table required in the fourth working example and an example (2) where the preceding AP is determined based on the AP list table and then the parameter table is updated. Next, the update of the AP list table illustrated in FIG. 18 in the fourth working example (S1802) will be described. Here, by assuming a case where the AP5 and the AP3 approach each other, a procedure for updating the AP list table in the AP5 will be described based on the example in FIG. 17. As illustrated in the drawing, the AP5 updates the AP list table as indicated in [initialization] and [after receiving polling signal from AP3] in this order (305-35) and also updates the parameter table of the own station (305-25).

Figure 19:
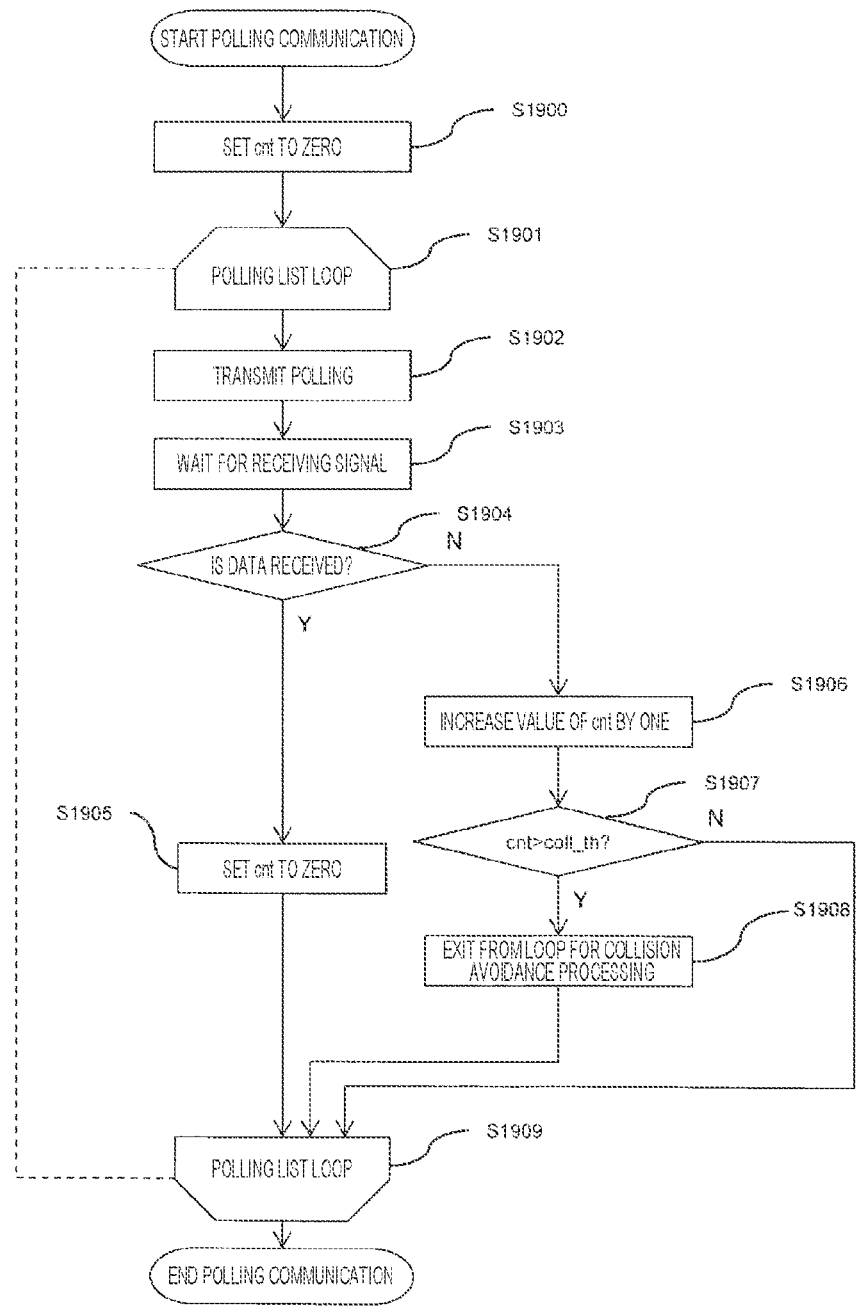
FIG. 19 is an operation flow of the access point in the polling communication for carrying out the collision avoidance processing in the fourth working example.

Meanwhile, FIG. 19 illustrates an operation flow of the access point within the polling communication period according to the working example. When starting the polling communication period, the access point sets, to zero, a counter (cnt) for counting the number of times of successive failures in the polling communication (S1900) and then starts a polling list loop (S1901). While sequentially transmitting the polling communication signals to the wireless terminals wirelessly connected to the own station (S1902), the access point waits for transmitting a data signal (S1903). When the data is successfully received (S1904: Y), the access point sets the cnt to zero (S1905) to repeat the polling list loop and then transmits the polling communication signal to the subsequent wireless terminal (S1902). On the other hand, when the data signal is not transmitted from the wireless terminal or the reception of the data signal is failed (S1904: N), the access point increases the value of the cnt by one (S1906) and compares the value of the cnt with the value of a counter threshold (coll_th). When the cnt has a smaller value (S1907: N), the access point repeats the polling list loop and transmits the polling communication signal to the subsequent wireless terminal (S1902). When the cnt has a larger value (S1907: Y), the access point determines that a signal collision with another access point has occurred and thus, exits from the polling list loop to carry out the collision avoidance processing (S1908). The series of operation described above is carried out until the data communication with the wireless terminals on a polling list is completed.

As the collision avoidance processing when the aforementioned signal collision is determined to have occurred, operation such as waiting for a random time or changing of the channel is carried out in order to avoid the signal collision. Alternatively, such operation may be configured such that each of the aforementioned operation is carried out depending on a case where the value of the cnt exceeds one of the plurality of (here, two) counter thresholds (coll_th1 and coll_th2).

With the operation flow described above, even in a case where the access points belonging to different groups from each other transmit the polling communication signals at similar timings and accordingly, a collision of the polling communication signals occurs, communication is still possible.

Additionally, when the own AP is not at the top of the group, in a case where, upon receiving the polling communication signal from another AP belonging to the same group, the information on NO_AP contained in the polling communication signal transmitted from the another AP is similar to the value of NO_AP stored in the parameter table of the own station, the preceding AP in the communication parameter information of the own AP is updated to the address information of the another AP. As a result, when cutting-in of another access point belonging to the same polling group and having the same NO_AP occurs as in the third working example, the signal collision can be avoided by updating the preceding AP.

According to the working example, a priority is given depending on the communication state, whereby a collision of signals occurring between different access points from each other can be avoided.

Fifth Working Example

Hereinafter, a fifth working example according to the invention will be described with reference to the drawings.

FIG. 20 illustrates examples of parameter tables 305-21 to 305-23 storing the parameters required for the access points (AP1 to AP3) 200-1 to 200-3, respectively, to carry out the invention according to the working example. A method for creating the parameter tables 305-21 to 305-23 of the access points 200-1 and 200-3, respectively, is similar to that described in FIG. 7 and thus, the description thereof is omitted here. The address information of the own station is stored in address, whereas the information on the preceding AP is stored in pre_AP. Gr_id indicates which group the own station belongs to and here stores the address information of the access point positioned at the top of the group. NO_AP stores information indicating how many access points are queued within the group to perform the polling communication before the own station starts the polling communication. comm_mode is a parameter for adjusting a traffic volume of the wireless communication in the own station. For example, as illustrated in FIG. 21, a data traffic volume is controlled for each of networks depending on the value of comm_mode. comm_mode can be given depending on the communication state and, for example, is determined in accordance with the value of NO_AP in FIG. 20. As a result, a larger data traffic volume can be given to the access point positioned closer to the top of the group on a priority basis.

According to the working example, a priority is given depending on the communication state, whereby the traffic volume can be adjusted based on the priority even in a case where a large number of the access points are densely present.

C. Advantageous Effects of Embodiments

The embodiments control a situation in which the plurality of access points is present such that each of the access points autonomously obtains the polling communication period through time sharing depending on the communication state, thereby avoiding the packet collision with another access point to ensure the QoS in the communication with a client.

D. Supplementary Note

The invention is not construed to be limited to the aforementioned working examples and includes various types of variations. For example, the aforementioned working examples have been described in detail in order to make the description of the invention easy to understand. Therefore, the working examples are not necessarily limited to the ones provided with the whole configurations that have been described. In addition, part of the configuration of a certain working example can be replaced with the configuration of another working example, while it is also possible to add the configuration of a certain working example to the configuration of another working example. Part of the configuration of each of the working examples can be subjected to addition, deletion, and replacement of another configuration.

Furthermore, part or all of the respective configurations, functions, processing units, processing means, and the like described above can be realized by hardware designed, for example, using an integrated circuit. The respective configurations, functions, and the like described above may be realized by software in which a processor parses a program that realizes each of the functions to execute. Information such as the programs, the tables, and the files that realize the respective functions can be placed on a recording apparatus including a memory, a hard disk, and a solid state drive (SSD), or alternatively, a recording medium including an IC card, an SD card, and a DVD.

Meanwhile, the control lines and the information lines considered to be necessary for the description are indicated and therefore, all of the control lines and the information lines on a product are not necessarily indicated. Actually, substantially all of the configurations may be considered to be connected to each other.

The wireless communication method, the apparatus, and the program according to the invention can be provided by a wireless communication program for causing a computer to carry out the respective procedures thereof, a computer-readable recording medium recording the wireless communication program, a program product including the wireless communication program and loadable in an internal memory of the computer, a computer such as a server including the program, and the like.

REFERENCE SIGNS LIST 200 access point
201 communicable area
202 wireless terminal
300 computer
301 CPU
302 memory
303 table storage unit
304 processing program storage unit
305-1 association table
305-2 parameter table
305-3 AP list table
306-1 table management unit
306-2 scheduling computation unit
306-3 polling signal processing unit
306-4 data signal processing unit
310 RF unit
320 interface
311 antenna

The invention claimed is:

1. A wireless communication method that manages channel usage of a plurality of access points (APs) having overlapping communication areas, comprising:
   transmitting, by each of the APs, a respective polling communication signal of a respective polling communication or a respective broadcast signal of a respective broadcast communication containing communication parameter information including address information of the respective AP, address information of a preceding AP among the plurality of APs, and group information of the respective AP;
   observing, by each of the APs, a channel prior to starting the respective polling communication or the respective broadcast communication to detect whether another AP among the plurality of APs is performing another respective polling communication or another respective broadcast communication;
   when detecting the polling communication signal or the broadcast signal from the other AP, adding, by one or more of the respective APs which detected the polling communication signal or the broadcast signal from the other AP, the address information and the group information of the other AP contained in the detected polling signal or the detected broadcast signal to channel usage information stored by the respective AP to update the channel usage information;
   determining, by each of the APs, the address information of the preceding AP that is to perform the polling communication or the broadcast communication immediately before the respective AP or the address information indicating the preceding AP is not present and the group information of the respective AP based on the channel usage information to create and manage the communication parameter information of the respective AP; and
   starting, by each of the APs, a respective service interval in accordance with the managed communication parameter information.

2. The wireless communication method according to claim 1,
   wherein each of the nearby APs determines the group information contained in the polling communication signal transmitted from the preceding AP as the group information thereof to create the communication parameter information thereof.

3. The wireless communication method according to claim 1,
   wherein, when the respective AP is at a top of a group, each of the other APs respectively starts the polling communication or transmits the broadcast communication signal after a predetermined first waiting time from a start of a predetermined service interval, and
   when the respective AP is not at the top of the group, each of the other APs respectively starts the polling communication or transmits the broadcast communication for a connected wireless terminal after a predetermined second waiting time from a time point when a polling communication period or a broadcast communication period of the preceding AP is determined to have ended.

4. The wireless communication method according to claim 3,
   wherein the first waiting time until the AP at the top of the group starts the respective polling communication or the respective broadcast communication after the respective polling communication period or the respective broadcast communication period of the preceding AP belonging to the same group is determined to have ended is determined to be longer than or equal to the second waiting time until another of the APs not at the top of the group starts the respective polling communication or the respective broadcast communication.

5. The wireless communication method according to claim 3,
   wherein the polling communication period or the broadcast communication period of the preceding AP is determined to have ended when a completion notification signal for polling or broadcasting transmitted from the preceding AP is received, or when a communication prohibition period required by the polling communication signal or the broadcast signal ends.

6. The wireless communication method according to claim 5,
   wherein every time the polling communication signal or the broadcast signal transmitted from the preceding AP is received, the communication prohibition period is updated based on a duration field contained in the polling communication signal or the broadcast signal, or other information specifying the communication prohibition period for the polling communication or the broadcast communication.

7. The wireless communication method according to claim 3,
   wherein, after the group is formed,
   upon receiving the polling communication signal or the broadcast signal from another AP of the APs belonging to another group, each of the APs adds the polling communication signal or the broadcast signal from the other AP of the other group to the channel usage information thereof to update the channel usage information thereof, and each of the APs updates the communication parameter information thereof using the address information and the group information contained in the polling communication signal or the broadcast signal from the other AP of the other group as the address information of the preceding AP and the group information of the respective AP to make itself join the other group.

8. The wireless communication method according to claim 7, wherein, after the group is formed, when the respective AP is not at the top of the group, in a case where the preceding AP has not been determined to be present for a predetermined certain period, the respective AP determines that the respective AP itself is at the top of the group and updates the preceding AP and the group in the communication parameter information such that the preceding AP and the group represent the top of the group.

9. The wireless communication method according to claim 8, wherein the communication parameter information further includes a number of an order of the polling communication or the broadcast communication being performed by the respective AP within the group, and when the respective AP is not at the top of the group, each of the APs obtains the order of the respective AP by adding one to the order contained in the polling communication signal or the broadcast signal transmitted from another one of the APs to update the communication parameter information.

10. The wireless communication method according to claim 8, wherein, when the respective AP is not at the top of the group, in a case where the address information of the preceding AP contained in the polling communication signal or the broadcast signal transmitted from other one of the APs is similar to the address information of the preceding AP in the communication parameter information of the respective AP, or when the respective AP is not at the top of the group, in a case where the polling communication signal or the broadcast signal is received from other one of the APs belonging to the same group and at this time, indicating a number of an order of the polling communication or the broadcast communication being performed by the respective AP within the group, which is contained in the communication parameter information in the polling communication signal or the broadcast signal transmitted from the other one of the APs, is similar to the order in the communication parameter information of the respective AP, each of the APs updates the preceding AP in the communication parameter information thereof to the address information of the other one of the APs.

11. The wireless communication method according to claim 8, wherein the communication parameter information further includes a number of an order of the polling communication or the broadcast communication being performed by the respective AP within the group, and when the respective AP is not at the top of the group, in a case where the order contained in the polling communication signal or the broadcast signal transmitted from the other one of the APs has a larger value than the order of the respective AP, each of the APs updates the address information of the preceding AP and the group information in the communication parameter information thereof to the address information and the group information of the other one of the APs, and adds one to the order.

12. The wireless communication method according to claim 11, wherein the communication parameter information further includes an upper limit of a number of times of successive retransmission when the transmission of the polling communication signal or the broadcast signal is successively failed, each of the APs transmits the polling communication signal or the broadcast signal to a connected wireless terminal, and in a case where a number of times the reception of a data signal transmitted from the wireless terminal is successively failed exceeds the upper limit of the number of times of successive retransmission, each of the APs determines that a collision of the respective polling communication signals or the respective broadcast signals with at least one other of the APs has occurred and then carries out collision avoidance processing.

13. The wireless communication method according to claim 1, wherein the communication parameter information further includes traffic information indicating a traffic volume in a wireless network constituted by the respective AP, and each of the APs adjusts the traffic volume in the wireless network constituted by the respective AP based on the traffic information in the communication parameter information.

14. A wireless communication apparatus, comprising:

a memory configured to store an AP list table that manages channel usage information including address information of a plurality of APs having overlapping communications areas with the wireless communication apparatus, and a parameter table that manages communication parameter information including address information of the wireless communication apparatus, the address information of a preceding AP among the plurality of APs, and group information of the wireless communication apparatus; and a processing unit that is configured to:

transmit a polling communication signal or a broadcast signal containing the communication parameter information read from the parameter table, observe a channel prior to starting the polling communication or the broadcast communication to detect whether one of the APs performing polling communication or broadcast communication is present, when detecting a polling communication signal or a broadcast signal from the one of the APs, add, to the channel usage information, the address information of the one of the APs and the group information of the one of the APs contained in the detected polling communication signal or the detected broadcast signal to update the AP list table, refer to the AP list table to determine the address information of the preceding AP that is to perform polling communication or broadcast communication immediately before the wireless communication apparatus or the address information indicating that the preceding AP is not present and the group information of the wireless communication apparatus based on the channel usage information and create the communication parameter information in the parameter table, and start a service interval in accordance with the communication parameter information stored in the parameter table.

15. A non-transitory, computer readable medium storing a wireless communication program that, when executed by one or more processors of a wireless communication apparatus, causes the one or more processors to:

store an AP list table that manages channel usage information including address information of a plurality of APs having overlapping communications areas with the wireless communication apparatus;

store a parameter table that manages communication parameter information including address information of the wireless communication apparatus, the address information of a preceding AP among the plurality of APs, and group information of the wireless communication apparatus;

transmit a polling communication signal or a broadcast signal containing the communication parameter information read from the parameter table;

observe a channel prior to starting the polling communication or the broadcast communication to detect whether one of the APs performing polling communication or broadcast communication is present;

when detecting a polling communication signal or a broadcast signal from the one of the APs, add, to the channel usage information, the address information of the one of the APs and the group information of the one of the APs contained in the detected polling communication signal or the detected broadcast signal to update the AP list table;

refer to the AP list table to determine the address information of a preceding AP that is to perform polling communication or broadcast communication immediately before the wireless communication apparatus or the address information indicating that the preceding AP is not present and the group information of the wireless communication apparatus based on the channel usage information and create the communication parameter information in the parameter table; and start a service interval in accordance with the communication parameter information stored in the parameter table.

* * * * *